(12) United States Patent
Wang et al.

(10) Patent No.: US 9,092,072 B2
(45) Date of Patent: *Jul. 28, 2015

(54) INNER-SENSOR BASED POINTING DEVICE

(71) Applicant: CONTOUR DESIGN, INC., Windham, NH (US)

(72) Inventors: Steven Wang, Windham, NH (US); Les Scenna, Wilton, NH (US)

(73) Assignee: CONTOUR DESIGN, INC., Windham, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,267

(22) Filed: Aug. 14, 2014

(65) Prior Publication Data

US 2014/0354543 A1 Dec. 4, 2014

Related U.S. Application Data

(63) Continuation of application No. 12/960,909, filed on Dec. 6, 2010, now Pat. No. 8,823,644.

(60) Provisional application No. 61/267,616, filed on Dec. 8, 2009.

(51) Int. Cl.
*G06F 3/0354* (2013.01)
*G06F 3/0338* (2013.01)
*H01H 19/14* (2006.01)

(52) U.S. Cl.
CPC ............ *G06F 3/0354* (2013.01); *G06F 3/0338* (2013.01); *H01H 2019/146* (2013.01)

(58) Field of Classification Search
CPC .............................. G06F 3/0354; G06F 3/0362
USPC .......................................... 345/156–167, 184
See application file for complete search history.

(56) References Cited

U.S. PATENT DOCUMENTS

| 6,337,680 | B1 | 1/2002 | Hamaji |
| 2011/0037693 | A1 | 2/2011 | Chiang |
| 2011/0199306 | A1 | 8/2011 | Pan |

FOREIGN PATENT DOCUMENTS

| JP | 2000047812 A | 2/2000 |
| JP | 2000132331 A | 5/2000 |

(Continued)

OTHER PUBLICATIONS

"Ergonomic Equipment Can Take Away the Strain in Everyday Tasks," New York Times, Late Edition (East Coat), Nov. 15, 2001, 2 pages.

(Continued)

*Primary Examiner* — Michael Pervan
(74) *Attorney, Agent, or Firm* — Lando & Anastasi, LLP

(57) ABSTRACT

An inner-sensor based pointing device is presented. The pointing device includes a central housing having an aperture and a sleeve disposed surrounding a portion of the central housing, the sleeves rotatable about the portion of the central housing and slidable along a generally horizontal axis about the portion of the central housing. The pointing device further includes a sensor disposed in the central housing and aligned with the aperture, the sleeve positioned surrounding the sensor, wherein the sensor is capable of detecting rotational movement of the sleeve relative to the central housing and wherein the sensor is capable of detecting axial movement of the sleeve relative to the central housing. Additionally, the pointing device has a circuit in communication with the sensor, the circuit disposed within the central housing, the circuit capable of transmitting data to a computer regarding the movement of the sleeve.

57 Claims, 39 Drawing Sheets

(56) References Cited

FOREIGN PATENT DOCUMENTS

| | | |
|---|---|---|
| JP | 2006023915 A | 1/2006 |
| TW | M364911 U | 9/2009 |
| WO | 0206943 A1 | 1/2002 |
| WO | 0243046 A1 | 5/2002 |

OTHER PUBLICATIONS

"On a Roll," Call Center Magazine, vol. 15, No. 11, Nov. 2002, pp. 10-12.
"product News," ISHN vol. 43, No. 7, Jul. 2009, p. 43.
"Spotlight Best Practices," Professional Safety, vol. 53, No. 7, Jul. 2008, 9 pages.
"This Ain't No Palindrome," Call Center Magazine, vol. 16, No. 2, pp. 14-26, Feb. 2003.
Berger, Jennifer, "Rolling Away From Pain," Macworld, vol. 20, No. 9, Jun. 2003, 5 pages.
International Search Report for corresponding International Application No. PCT/IB2010/055667, mailed May 25, 2011, 3 pages.
Shaw, Keith, "Cool Tools," Network World, vol. 18, No. 46, Nov. 21, 2001, p. 50.
Shaw, Keith, "Cool Tools: Products That Have Graced the Cool Tool's Lab . . . ," Network World, vol. 9, No. 6, Feb. 11, 2002, p. 30.

INNER-SENSOR BASED POINTING DEVICE

CROSS REFERENCE TO RELATED APPLICATIONS

The present application is a continuation of and claims priority to U.S. patent application Ser. No. 12/960,909, filed Dec. 6, 2010, which claims the benefit of U.S. Provisional Patent Application No. 61/267,616, filed on Dec. 8, 2009, which are both incorporated herein by reference in their entirety.

BACKGROUND

In computing, a pointing device functions by detecting two-dimensional motion relative to its supporting surface. The pointing device sometimes features other elements, such as "wheels", which allow the user to perform various system-dependent operations, or extra buttons or features can add more control or dimensional input. The motion of the pointing device typically translates into the motion of a pointer on a display, which allows for fine control of a Graphical User Interface (GUI). Typically these pointing devices utilize a "point and click" sequence of moving the cursor to the desired position and depressing a button to select an action.

There are several different styles of pointing devices such as a mouse, trackball, joystick, touchpad and the like. A mouse is a pointing device that functions by detecting two-dimensional motion relative to its supporting surface. Physically, a mouse consists of an object held under one of the user's hands, with one or more buttons. A mouse may sometimes features other elements, such as "wheels", which allow the user to perform various system-dependent operations, or extra buttons or features that can add more control or dimensional input.

A trackball is a pointing device consisting of a ball held by a socket containing sensors to detect a rotation of the ball about two axes—like an upside-down mouse with an exposed protruding ball. The user rolls the ball with the thumb, fingers, or the palm of the hand to move a cursor. Large tracker balls are common on graphical workstations for easy precision.

A joystick is an input device consisting of a stick that pivots on a base and reports its angle or direction to the device it is controlling. Joysticks are often used to control video games, and usually have one or more push-buttons whose state can also be read by the computer.

A touchpad is a pointing device consisting of specialized surface that can translate the motion and position of a user's fingers to a relative position on screen. Touchpads are a common feature of laptop computers and also used as a substitute for a computer mouse where desk space is scarce. Touchpads can also be found on personal digital assistants (PDAs) and some portable media players, such as the iPod® using a click wheel.

SUMMARY

Conventional mechanisms such as those explained above suffer from a variety of deficiencies. One such deficiency is that conventional pointing devices require a predefined amount of desk space. A further deficiency with conventional pointing devices is that the user's hands must be removed from the keyboard to use the pointing device. In addition, injuries have been recorded based on reaching an awkward distance to access the mouse or positioning the mouse at an incorrect height for ergonomic operation.

Embodiments of the invention significantly overcome such deficiencies and provide mechanisms and techniques that provide a pointing device that is controllable while the hands remain on the keyboard. In addition, the pointing device minimizes strain on wrist and shoulder while providing fast and precise positioning functions.

In a particular embodiment, a pointing device includes a central housing and a sleeve disposed surrounding a portion of the central housing, wherein the sleeve is rotatable about the portion of the central housing and wherein the sleeve is slidable along a generally horizontal axis about the portion of the central housing. The pointing device further includes a sensor disposed in the central housing, the sleeve positioned surrounding the sensor, and wherein the sensor is capable of detecting movement of the sleeve relative to the central housing. The pointing device additionally includes a circuit in communication with the sensor, the circuit capable of transmitting data to a computer regarding the movement of the sleeve.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 15b comprises a side view of the pointing device incorporating a pair of leaf springs of FIG. 15a;

FIG. 16b comprises a side view of the pointing device incorporating a pair of solenoids of FIG. 16a;

FIG. 16c comprises a cross-sectional side view of the pointing device incorporating a pair of solenoids of FIG. 16a;

FIG. 17b comprises a side view of the pointing device incorporating a pair of leaf springs and switches of FIG. 17a;

FIG. 20b comprises a cross-sectional view of a left hand portion of the inner-sensor based pointing device of FIG. 20a;

FIG. 20c comprises a cross-sectional view of a center portion of the inner-sensor based pointing device of FIG. 20a;

FIG. 20d comprises a cross-sectional view of a right hand portion of the inner-sensor based pointing device of FIG. 20a;

FIG. 21 comprises an isometric view of the inner-sensor pointing device of FIG. 20a;

FIG. 23c comprises an isometric bottom view of the keyboard platform riser of FIG. 23a;

DETAILED DESCRIPTION

Figure 1:
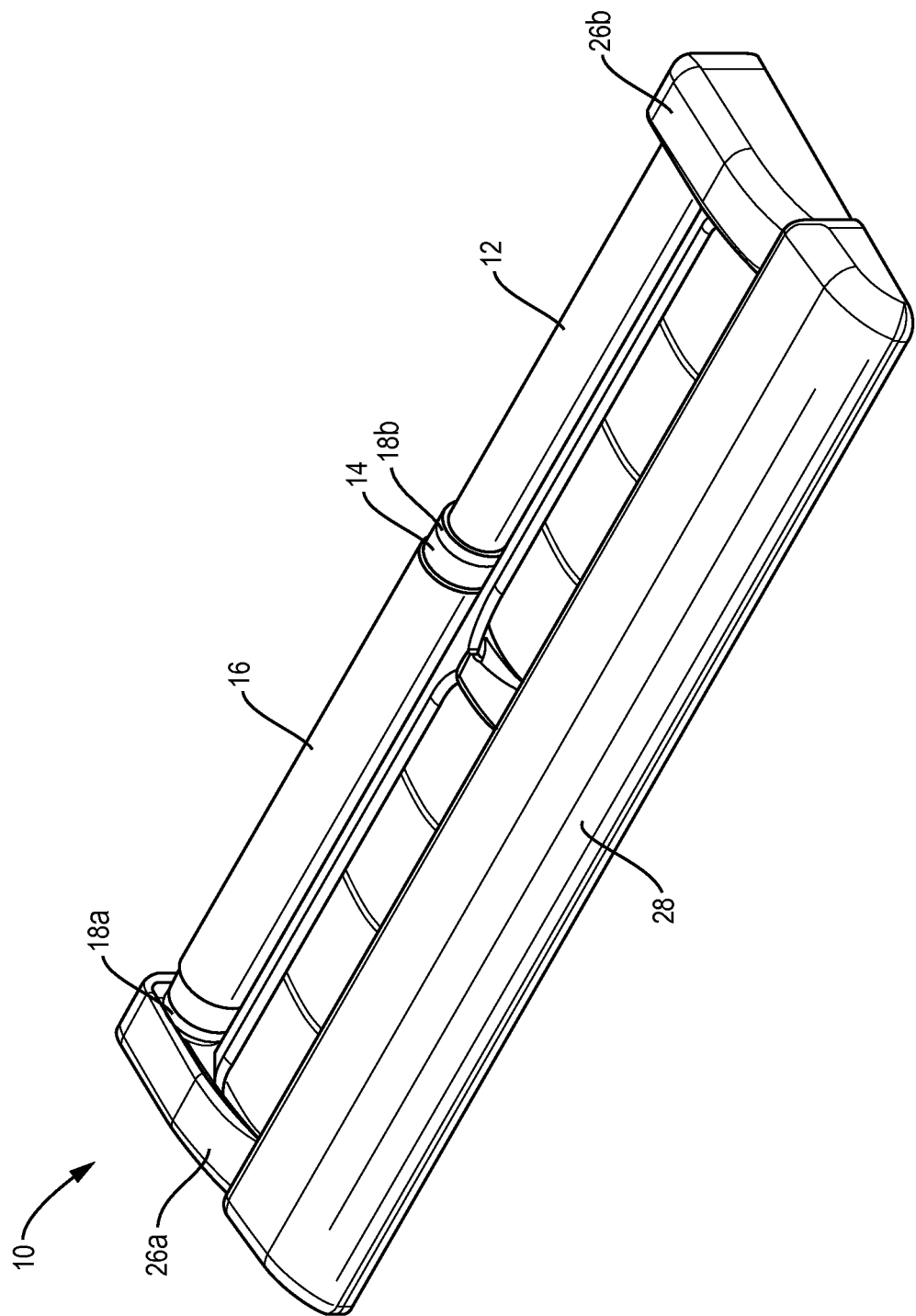
FIG. 1 comprises a diagram of an inner-sensor pointing device in accordance with embodiments of the invention.

Referring now to FIG. 1, a first embodiment of a pointing device 10 is shown. The pointing device 10 includes a central housing 12. The central housing 12 contains additional parts, discussed in detail below. The pointing device 10 also includes a sleeve 14 which fits over a portion of central housing 12. Sleeve 14 is rotatable about a portion of the central housing, and is also slidable along a length of the central housing 12. Sleeve 14 is supported by bushings 18a and 18b. Sleeve 14 includes a grip 16. The central housing 12, sleeve 14, bushings 18a and 18b and casing 16 comprise a roller assembly, described in detail below. Also shown are portions 26a and 26b of a housing which supports the roller assembly. Also shown is wrist support 28.

Figure 2:
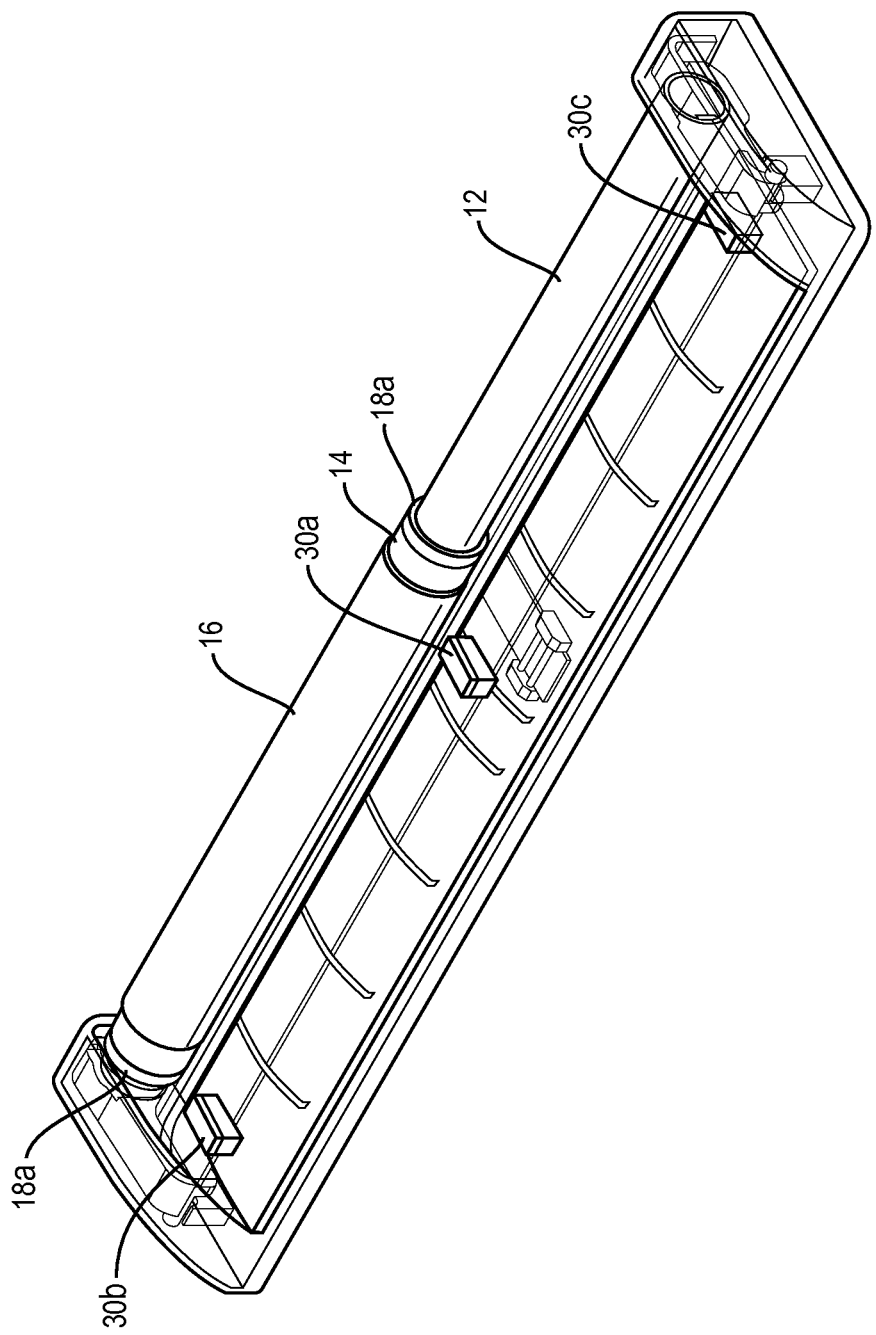
FIG. 2 comprises a transparent housing view of a portion of the inner-sensor pointing device of FIG. 1.

FIG. 2 provides a transparent housing view of the roller assembly and housing. Shown are switches 30a, 30b and 30c. Here the switches are shown as snap switches, however other types of switches (e.g., proximity switches) could also be used. Switch 30a is used to detect downward movement of the roller assembly and carriage, when a user pushes down on the roller assembly to initiate an action referred to as a "mouse click". As described below, the carriage and roller assembly are movable with respect to the base.

Switches 30b and 30c are limit switches and are used to detect when the sleeve 14 has reached the end of its potential horizontal movement along central housing 12 in either a left direction (switch 30b) or a right direction (switch 30c).

Figure 3:
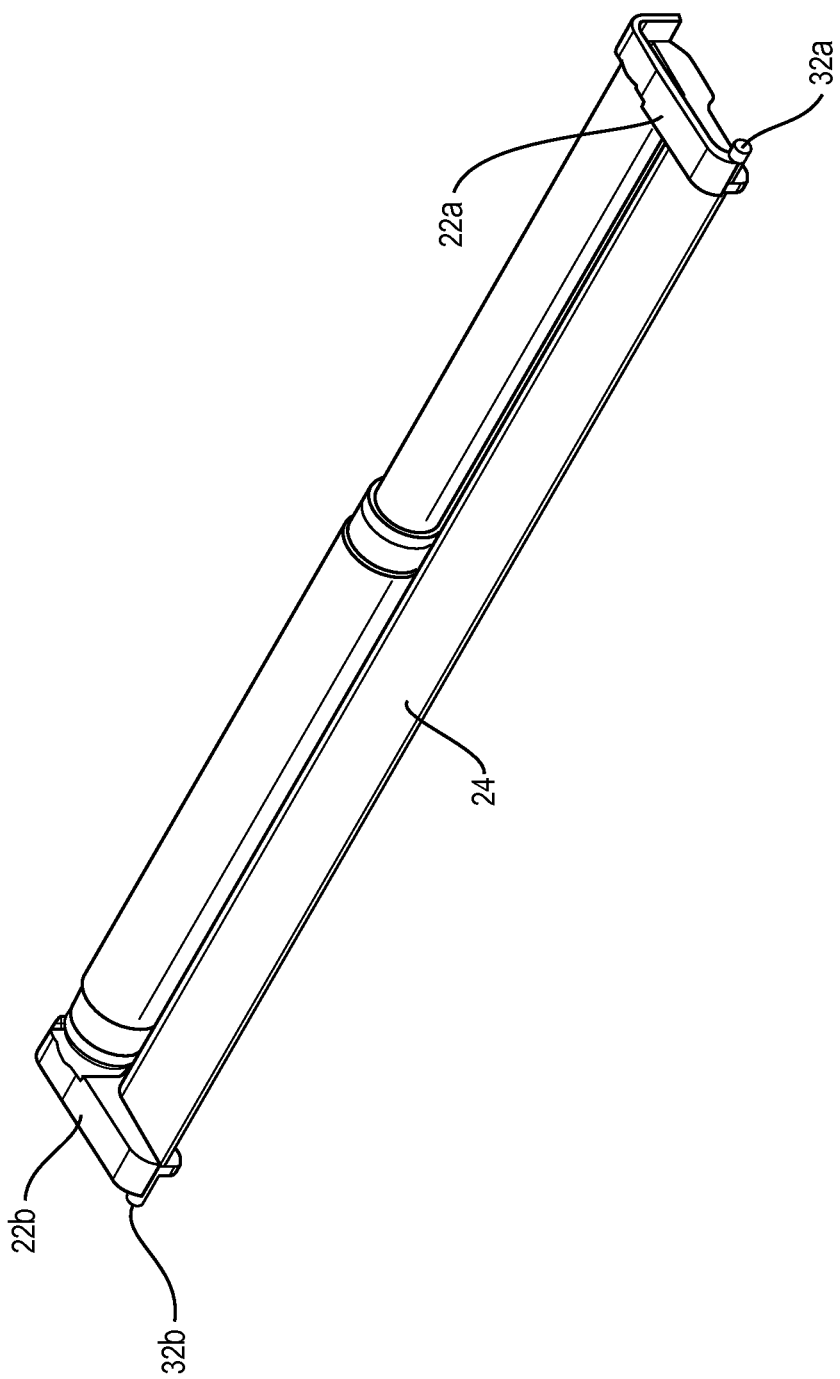
FIG. 3 comprises a diagram of a carriage and roller assembly of the inner-sensor pointing device of FIG. 1.

Referring now to FIG. 3, the carriage and roller assembly are shown. Carriage 24 includes end pieces 22a and 22b. End piece 22a includes a pivot 32a, and end piece 22b includes a pivot 32b. The pivots fit within holes in the base and permit movement of the carriage and roller assembly with respect to the base.

Figure 4:
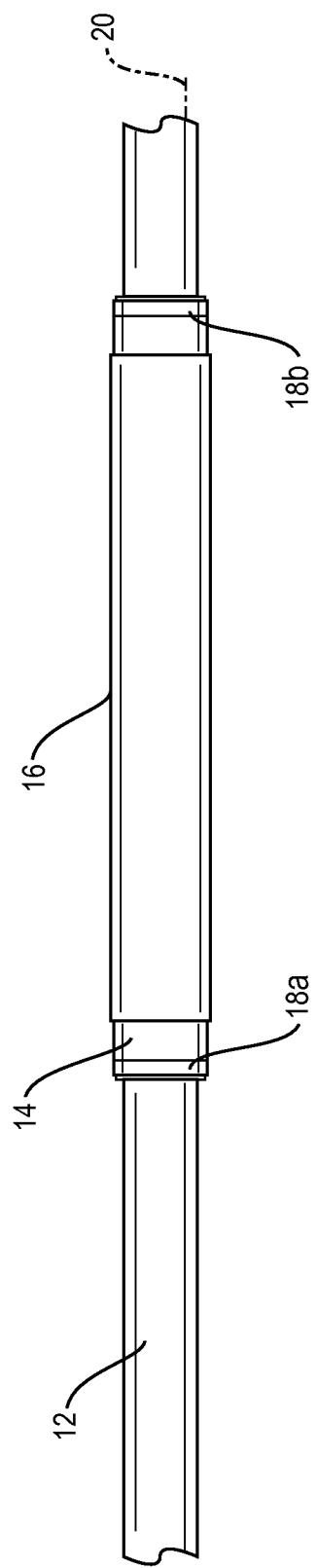
FIG. 4 comprises a diagram of the roller assembly of the inner sensor pointing device of FIG. 1.

FIG. 4 shows the roller assembly. The roller assembly includes a central housing 12. The central housing 12 contains additional parts, discussed in detail below. Also shown is a sleeve 14 which fits over a portion of central housing 12. Sleeve 14 is rotatable about a portion of the central housing, and is also slidable along a length of the central housing 12. Sleeve 14 is supported on central housing 12 by bushings 18a and 18b which allow the rotational and sliding movement of the sleeve with respect to the central housing. While central housing 12 is shown as generally tubular in the drawings, the central housing could also include shapes having a generally circular cross-section; a cross-section having at least one flat surface and at least one curved surface, and a cross-section having at least three rounded corners.

Figure 5:
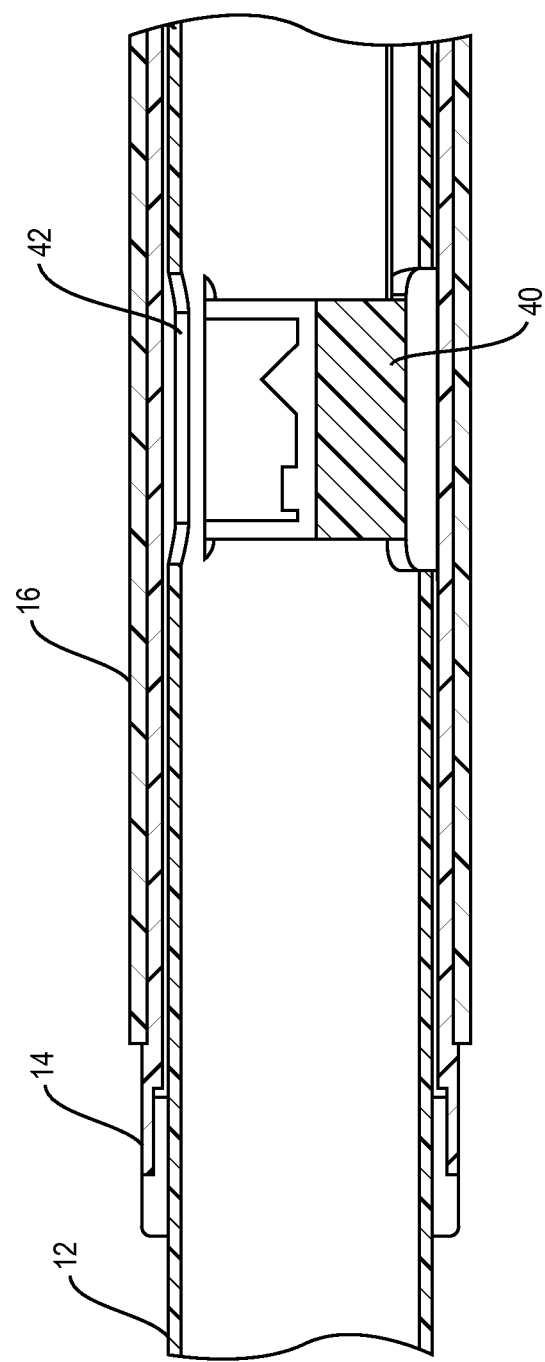
FIG. 5 is a cross-sectional view of the roller assembly showing the inner-sensor.

Referring now to FIG. 5, a cross-sectional view of a section of the roller assembly is shown. A sensor 40 is paced within central housing 12. The sensor 40 is shown as a laser sensor, though other types of sensors, including but not limited to an optical sensor or a rollerball, could also be used. Also shown is an aperture 42 in central housing 12, through which the sensor can detect movement of the sleeve with respect to the central housing.

Figure 6:
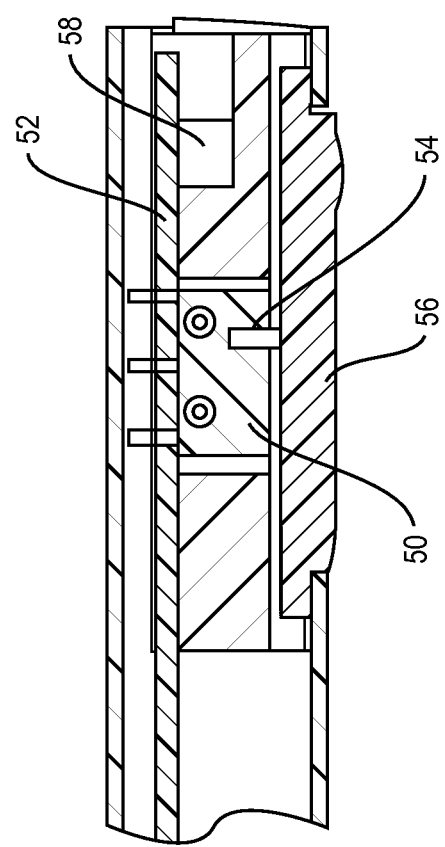
FIG. 6 is a cross-sectional view showing an end portion of the roller assembly and carriage.

Referring now to FIG. 6, a cross-sectional view of an end section of the roller assembly is shown. A limit switch 50 is shown mounted within central housing 12 and supported by switch bracket 58. Switch 50 is mounted on circuit board 52. Switch 50 in this example is a mechanical switch and includes a plunger 54. Plunger 54 is in mechanical communication with bumper 56. In use, when the sleeve extends near the end of the central housing, the sleeve will engage bumper 56 which will cause plunger 54 to be driven into switch 50.

In a particular embodiment, a mode referred to herein as "power scroll" can be entered. When the sleeve is at or near the end of travel on one side or the other of the central housing, a power scroll mode in entered, wherein the sleeve can be used as a scroll wheel to quickly scroll through a document. Moving the sleeve away from the end of the central housing results in exiting the power scroll mode.

Figure 7:
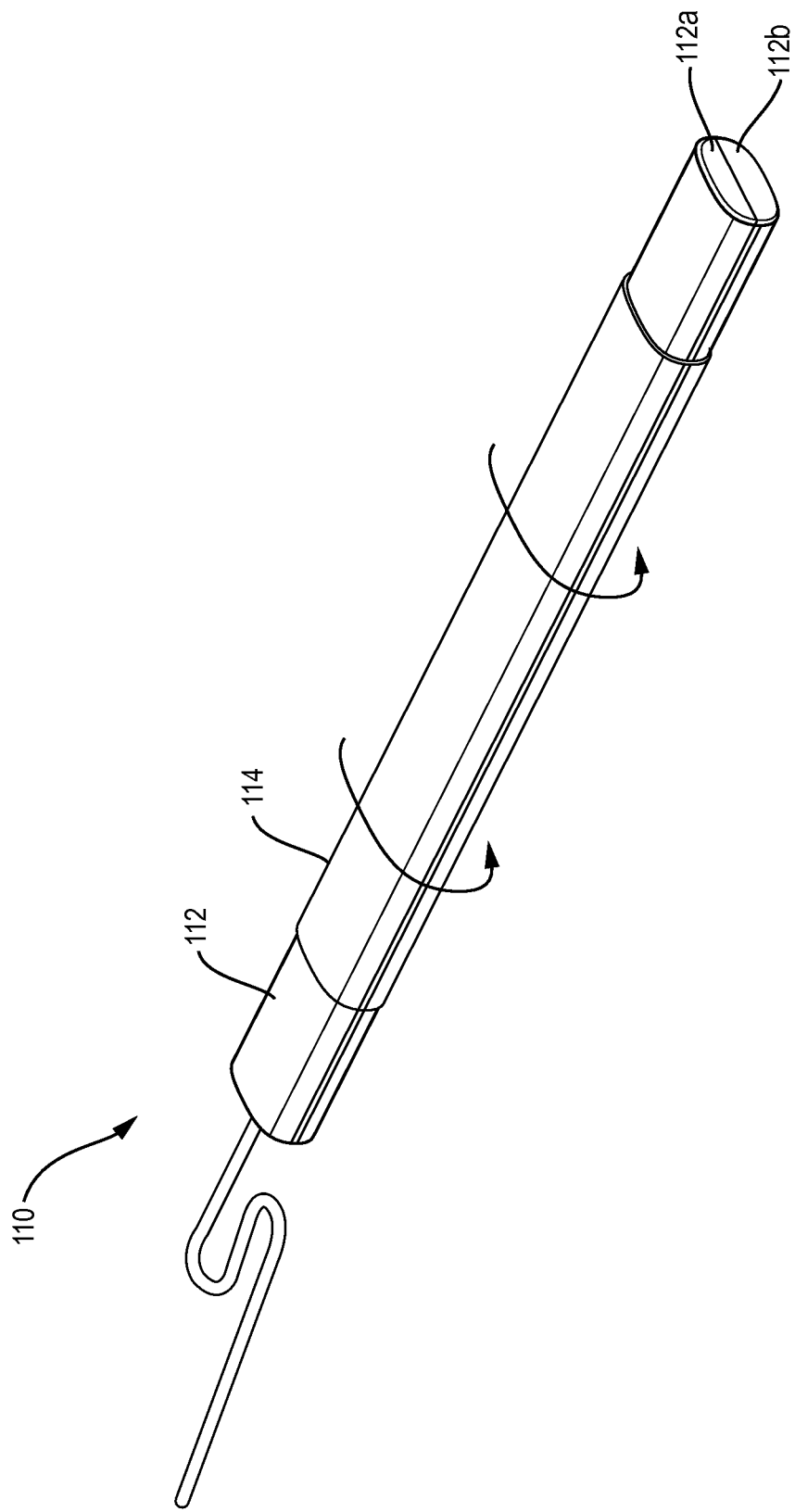
FIG. 7 comprises a diagram of another pointing device in accordance with embodiments of the invention.

Referring now to FIG. 7, another embodiment of a pointing device 110 is shown. The pointing device 110 includes a central housing 112 comprises two pieces 112a and 112b which are removably attachable to each other. The central housing 112 contains additional parts, discussed in detail below. The pointing device 110 also includes a sleeve 114 which fits over a portion of central housing 112. Sleeve 114 is rotatable about a portion of the central housing, and is also slidable along a length of the central housing 112. Pointing device 110 communicates with a computer or similar device by way of cable 116.

Figure 8:
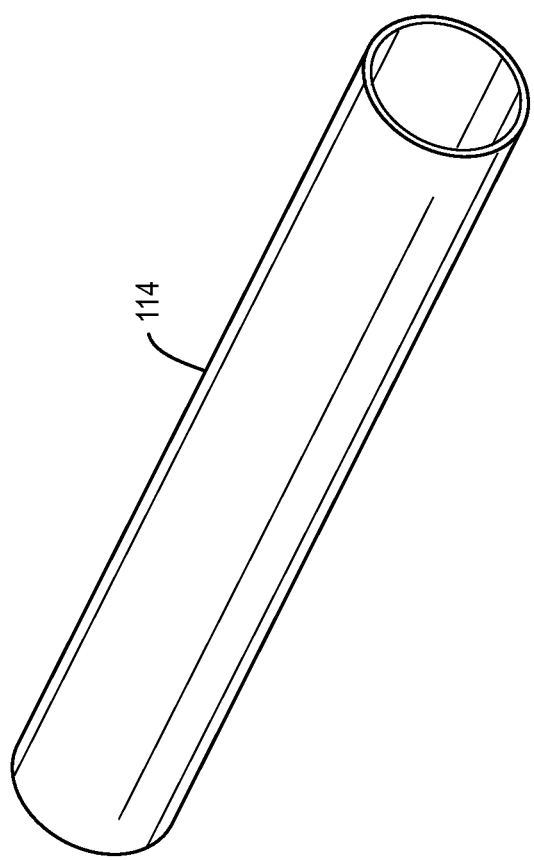
FIG. 8 comprises a diagram of a sleeve of the pointing device in accordance with embodiments of the invention.

FIG. 8 shows a sleeve 114. In one embodiment the sleeve 114 is flexible and is made from plastic, cloth, paper or other material, wherein the sleeve takes the shape of the central housing when installed surrounding a portion of the housing. In another particular embodiment the sleeve is made from a rigid material. The sleeve may be provided with indicia printed thereon, and the sleeve may be replaceable by the user wherein the user replaces a sleeve with another sleeve.

Figure 9:
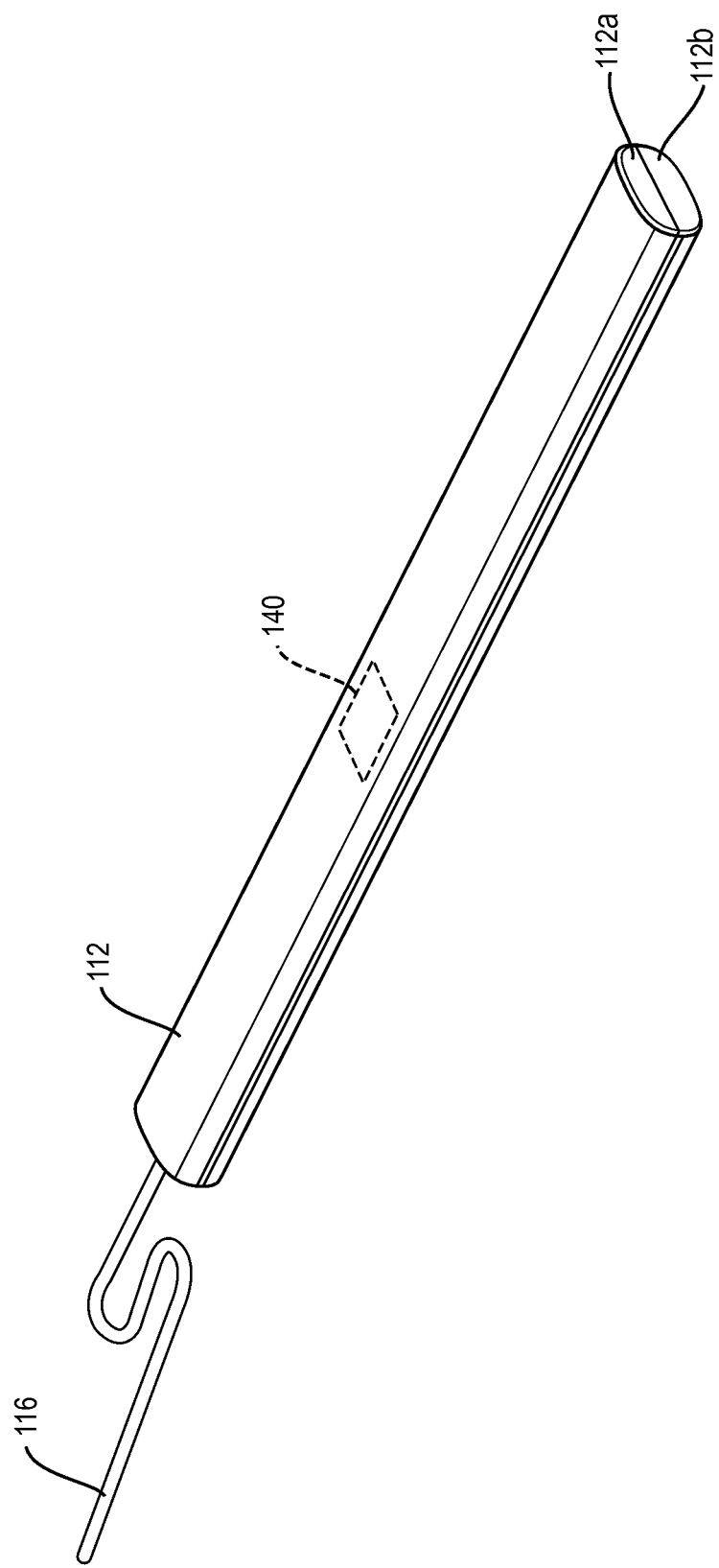
FIG. 9 comprises a diagram of the central housing in accordance with embodiments of the invention.

Referring now to FIG. 9, a central housing 112 is shown. In this embodiment central housing 112 is comprised of two pieces, a top piece 112a and a bottom piece 112b which are removably attached to each other. The central housing 112 contains the sensor 140, which is capable of detecting movement of the sleeve with respect to the central housing 112. The central housing also includes the circuit for communicating the data from the sensor to the computer.

Figure 10:
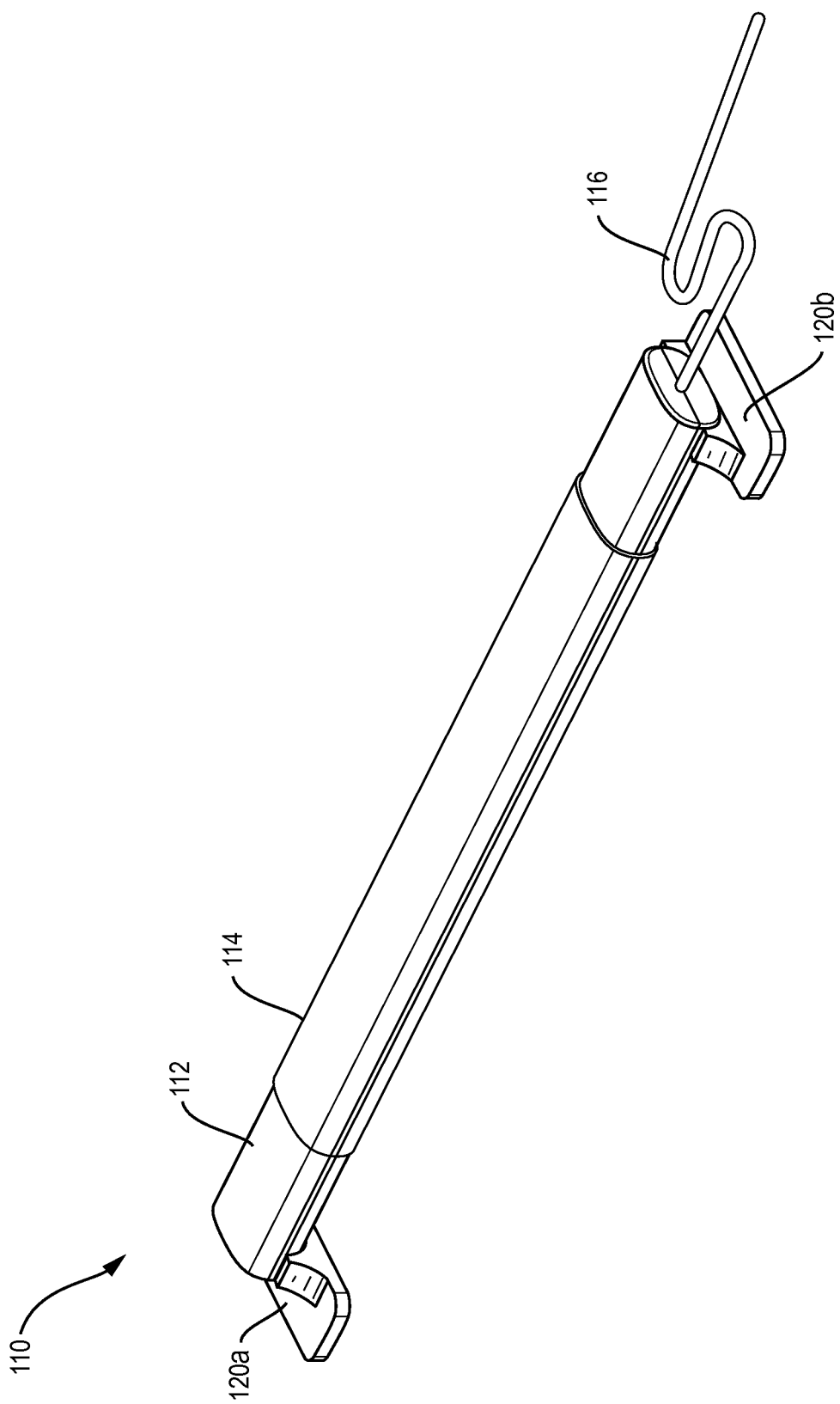
FIG. 10 comprises a diagram of the pointing device including a base in accordance with embodiments of the invention.

Referring now to FIG. 10, the pointing device 110 is shown including a base comprised of two parts 120a and 120b. The base supports the central housing 112 such that sleeve 114 is capable of moving about the central housing.

Figure 11:
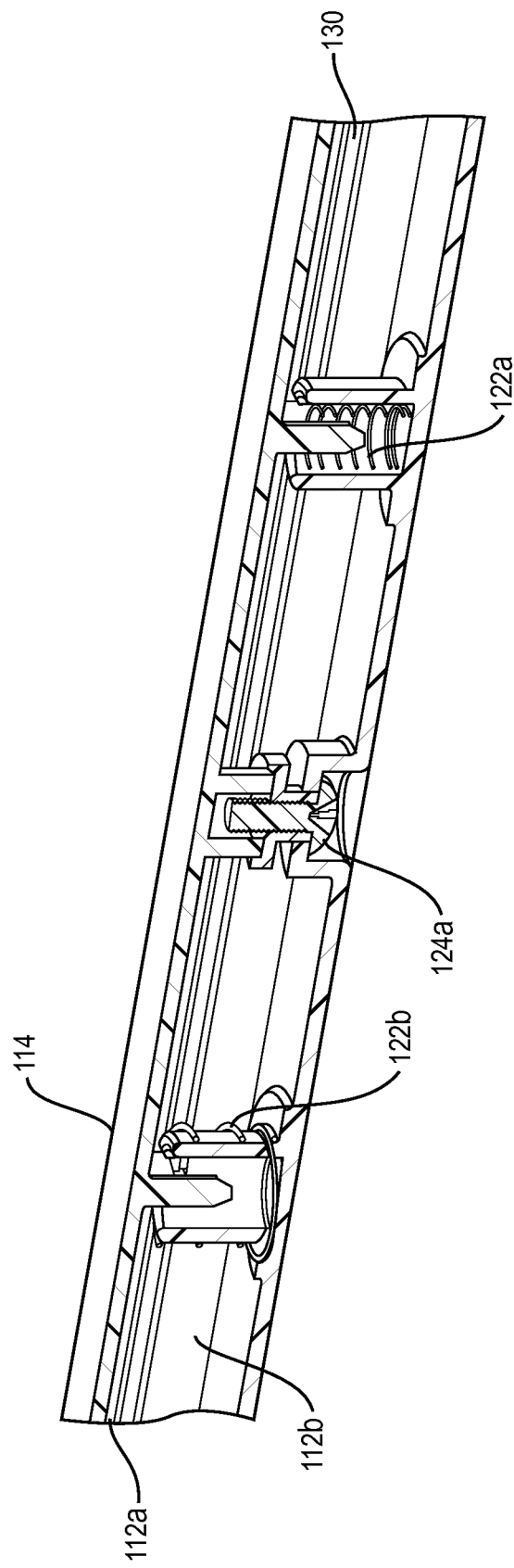
FIG. 11 comprises a diagram of a cut-away view of a section of central housing showing certain internal mechanisms thereof in accordance with embodiments of the invention.
Figure 12:
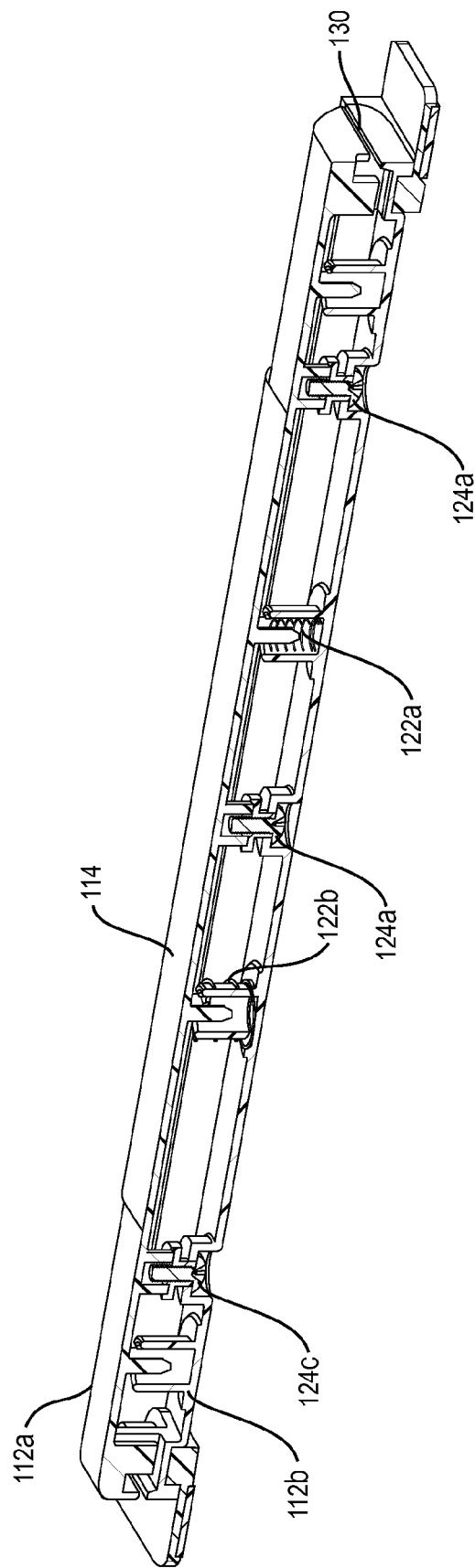
FIG. 12 comprises a diagram of a cut-away view of the central housing showing certain internal mechanisms thereof in accordance with embodiments of the invention.
Figure 13:
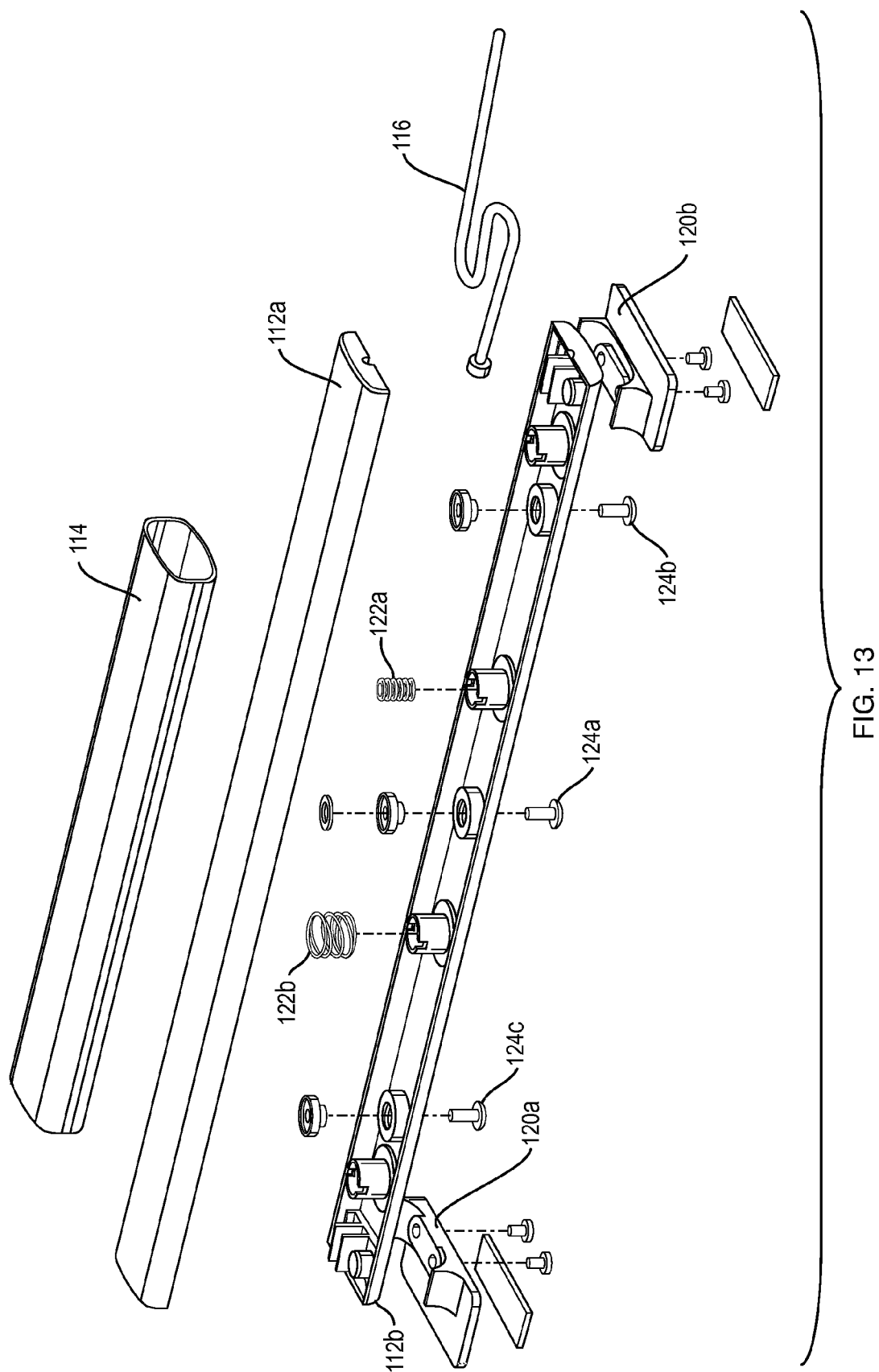
FIG. 13 comprises a diagram of an exploded view of the pointing device in accordance with embodiments of the invention.

FIGS. 11-13 show some of the components internal to central housing 112. Internal components not shown in these views include a sensor, a circuit, and at least one switch. Referring now to FIG. 11 a section of the central housing is shown in cut-away. The sleeve 114 surrounds upper portion of central housing 112a and the lower portion of central housing 112b. Also shown are springs 122a and 122b. The springs 122a and 122b bias upper portion of central housing 112a away from lower portion of central housing 112b, resulting in a gap 130 between the two portions of central housing 112. Maintaining the two portions of central housing together is screw 124a. The gap 130 allows the top portion to be pushed down and can activate a switch (not shown).

Referring now to FIG. 12, the central housing is shown in cut-away. The sleeve 114 surrounds a section of upper portion of central housing 112a and the lower portion of central housing 112b. Also shown are springs 122a and 122b. The springs 122a and 122b bias upper portion of central housing 112a away from lower portion of central housing 112b, resulting in a gap 130 between the two portions of central housing 112. Maintaining the two portions of central housing together are screws 124a, 124b and 124c. The gap 130 allows the top portion to be pushed down and can activate a switch (not shown).

In a particular embodiment a switch is disposed proximate screw 124b and another switch is disposed proximate screw 124c. The switch adjacent screw 124b would be activated when a user pushed down on the end of central housing section 112a near the switch to emulate the action of a user right-clicking a conventional mouse switch. Similarly, the switch adjacent screw 124c would be activated when a user pushed down on the end of central housing section 112a near the switch to emulate the action of a user left-clicking a conventional mouse switch.

Referring now to FIG. 13, an exploded view of the pointing device 112 is shown. The sleeve 114 surrounds upper portion of central housing 112a and the lower portion of central housing 112b. Also shown are springs 122a and 122b. The springs 122a and 122b bias upper portion of central housing 112a away from lower portion of central housing 112b, resulting in a gap between the two portions of central housing 112. Maintaining the two portions of central housing together are screws 124a, 124b and 124c. The gap 130 allows the top portion to be pushed down and can activate a switch (not shown). Also shown are base pieces 120a and 120b and cable 116.

Figure 14A:
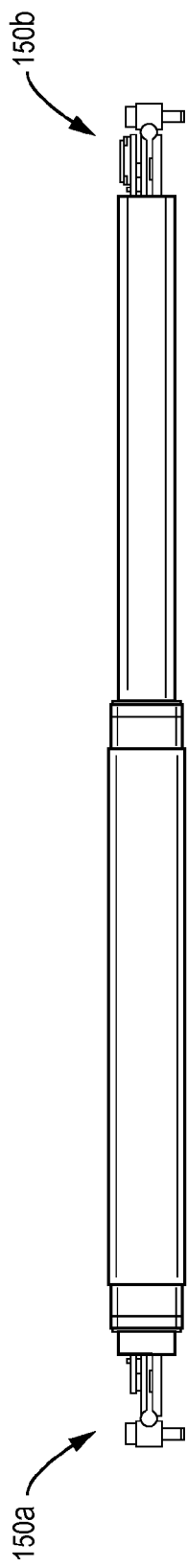
FIG. 14a comprises a diagram of a an inner-sensor pointing device including a pair of flexures in accordance with embodiments of the invention.
Figure 14B:
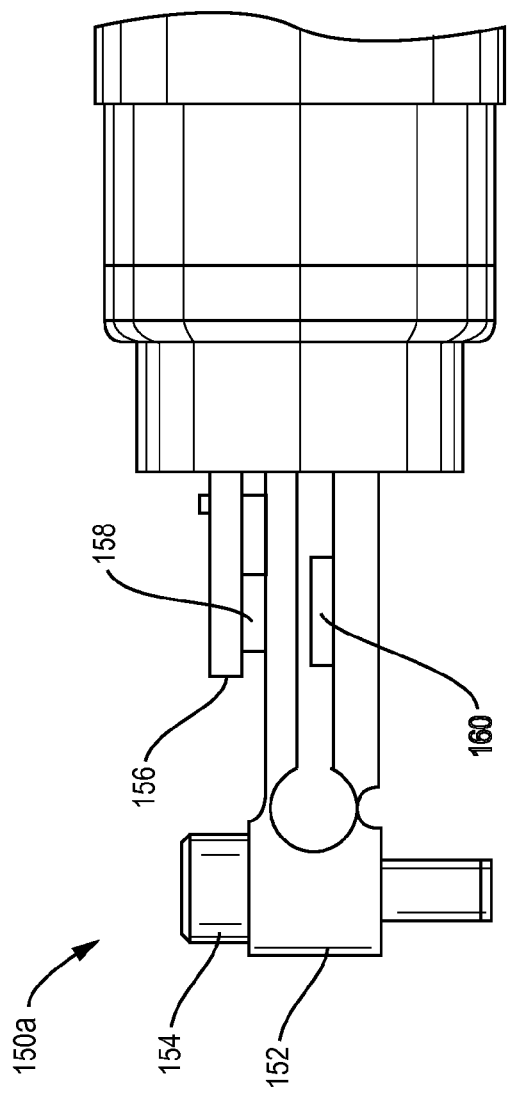
FIG. 14b comprises a diagram of a flexure of the inner-sensor pointing device in accordance with embodiments of the invention.
Figure 14C:
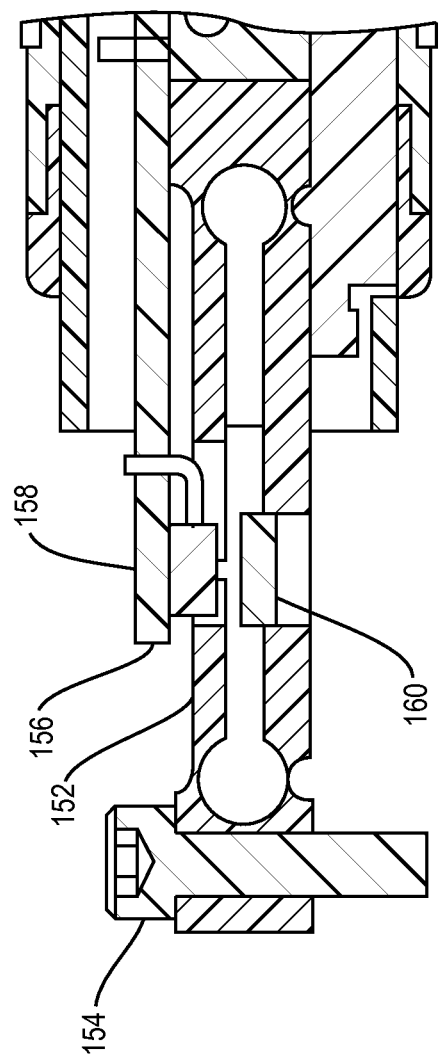
FIG. 14c comprises a cross-sectional view of the flexure of FIG. 14b.

Referring now to FIGS. 14a through 14c, various views of a flexure assemblies 150a and 150b are shown. As shown in FIG. 14a, each end of the inner-sensor pointing device includes a respective flexure assembly. The inner-sensor pointing device is supported by the flexure assemblies 150a and 150b. Downward pressure applied by a user to the inner-sensor pointing device results in the flexure assemblies registering a "primary" click, similar to a left mouse click on conventional mouse devices. The downward pressure can be applied at any location on the inner-sensor pointing device and will register.

Referring now to FIGS. 14b and 14c a view of the flexure assembly 150a is shown. In this embodiment flexure assembly 150a includes a flexure 152, which is secured to a base (not shown) by attachment device (e.g., a screw) 154. The attachment device secures one end of the flexure to the base, while the remainder of the flexure assembly 150a supports the remainder of the inner-sensor pointing device.

Flexure 152 is made of a deformable material, and has a "dog-bone" shaped opening extending there through. When a user applies a downward force to the inner-sensor pointing device, flexure 152 of flexure assembly flexes, such that the parts 158 and 160 of proximity switch are brought closer together. When enough downward pressure has been applied by a user to the inner-sensor pointing device, the proximity switch (either alone or in combination with another proximity switch) detects the change in position and indicates a primary click event has occurred.

Also shown is a circuit board 156 including a proximity switch in this example is a Hall-effect device which includes a sensor 158 and a magnet 160. The sensor outputs a signal based on how close the sensor 158 is to magnet 160. The closer they are, the sensor outputs a larger voltage. Once a certain threshold voltage is reached, a primary click is determined to have happened. The sensor can be used to provide an audio feedback (e.g., a click sound) to the user to indicate a primary click operation has occurred. In this embodiment, the outputs of the sensor of proximity switch 150*a* and the output of proximity switch 150*b* are added together, and when the sum of the outputs exceeds a predetermined threshold, a primary click operation has occurred. Alternately, each proximity switch could be used independently; to determine when a right click operation has occurred and when a left click operation has occurred.

Figure 15A:
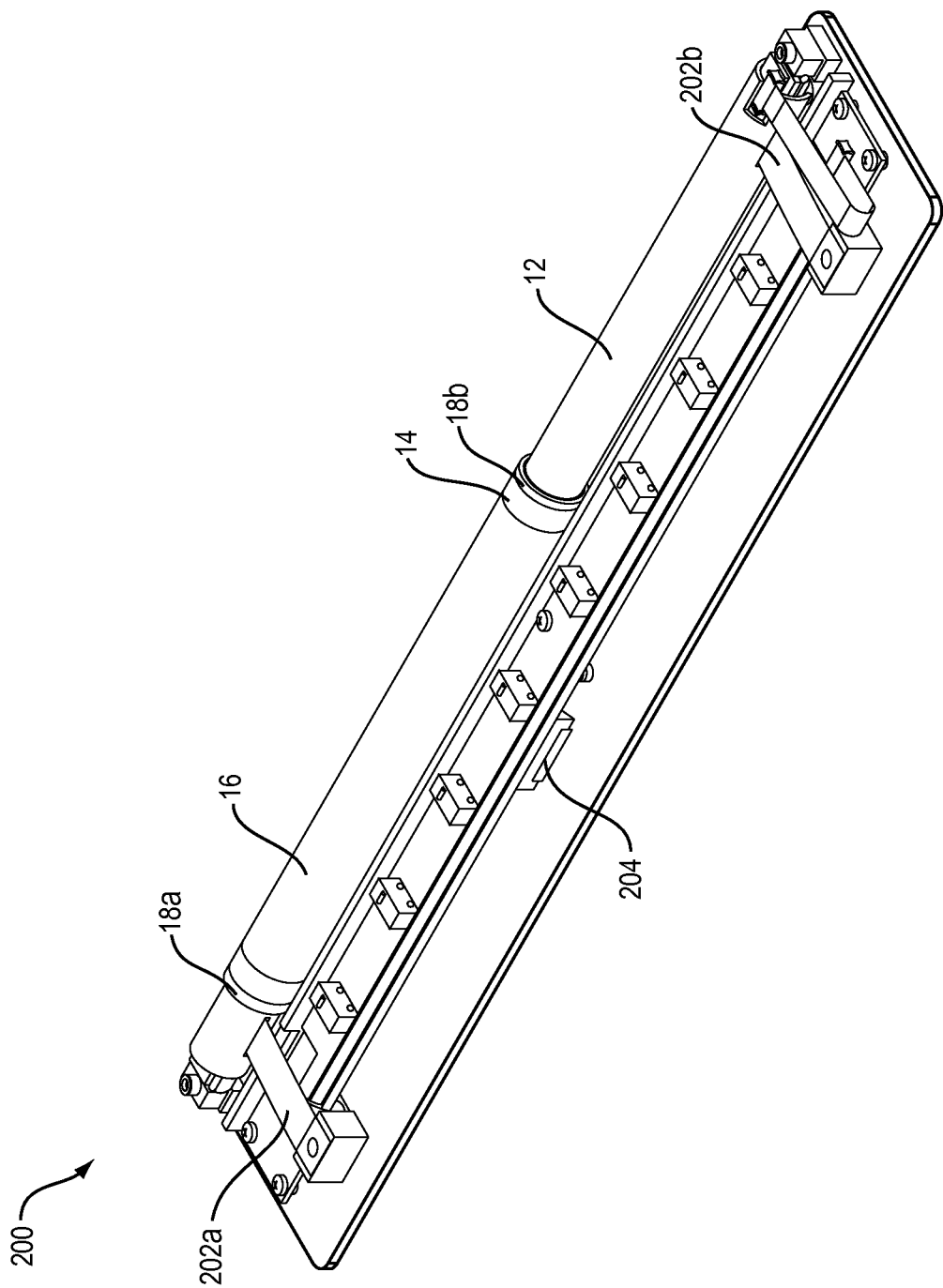
FIG. 15a comprises a diagram of an embodiment of a pointing device incorporating a pair of leaf springs.
Figure 15B:
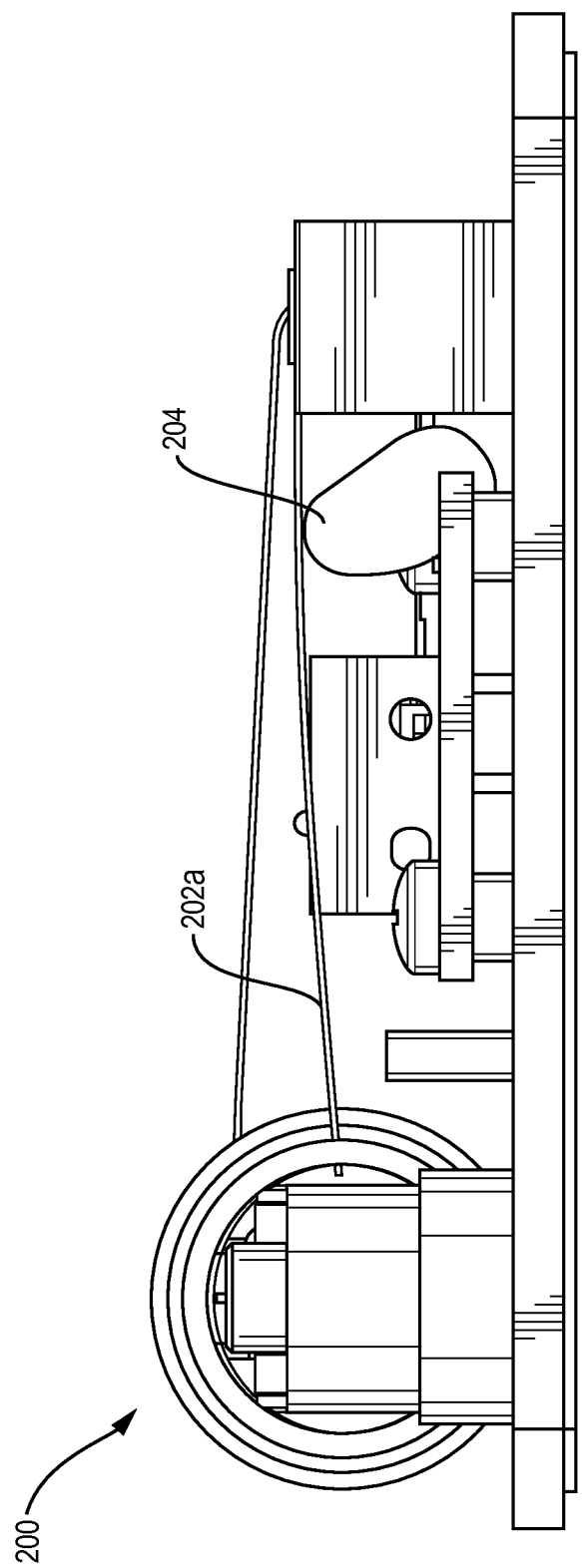

Referring now to FIGS. 15*a-b* an embodiment of a pointing device 200 incorporating a pair of leaf springs 202*a* and 202*b* is shown. The roller assembly comprising central housing 12, sleeve 14, bushings 18*a* and 18 are supported by leaf springs 202*a* and 202*b*, which are located proximate the ends of central housing 12. When a force is applied by the user in a generally downward direction on the roller assembly, the leaf springs deflect. The downward movement triggers one or more switches indicating that a "click" operation is underway. This click operation may be used, for example, to perform a drag and drop operation with the pointing device. A typical downward force (also referred to as a "pick force") to achieve the click operation is generally 50 to 120 grams of force, though this could be adjusted to achieve an optimal required force. As shown in FIG. 15*b*, a lobe 204 is used to perform the pick force adjustment.

Figure 16A:
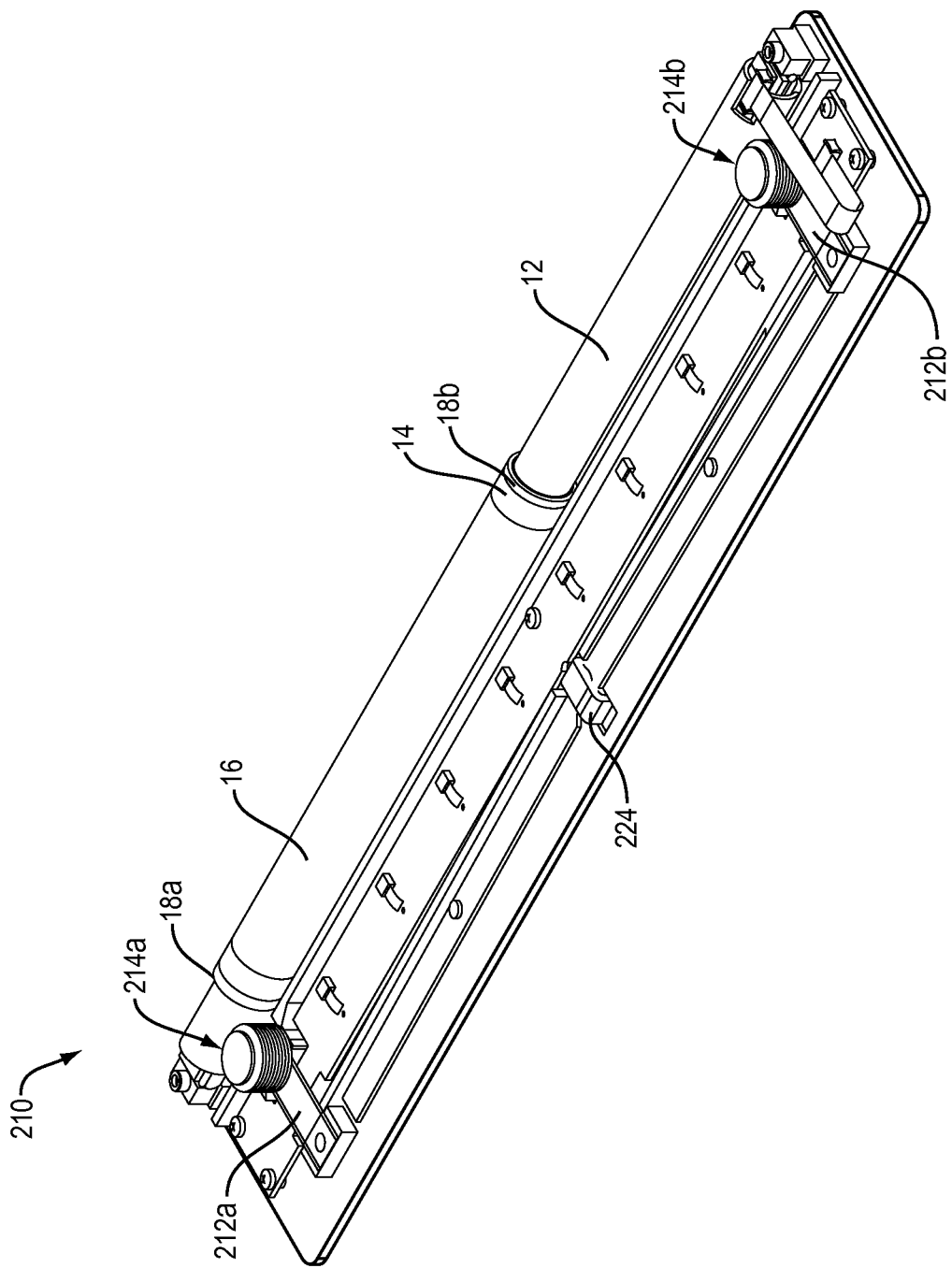
FIG. 16A comprises a diagram of an embodiment of a pointing device incorporating a pair of solenoids.
Figure 16B:
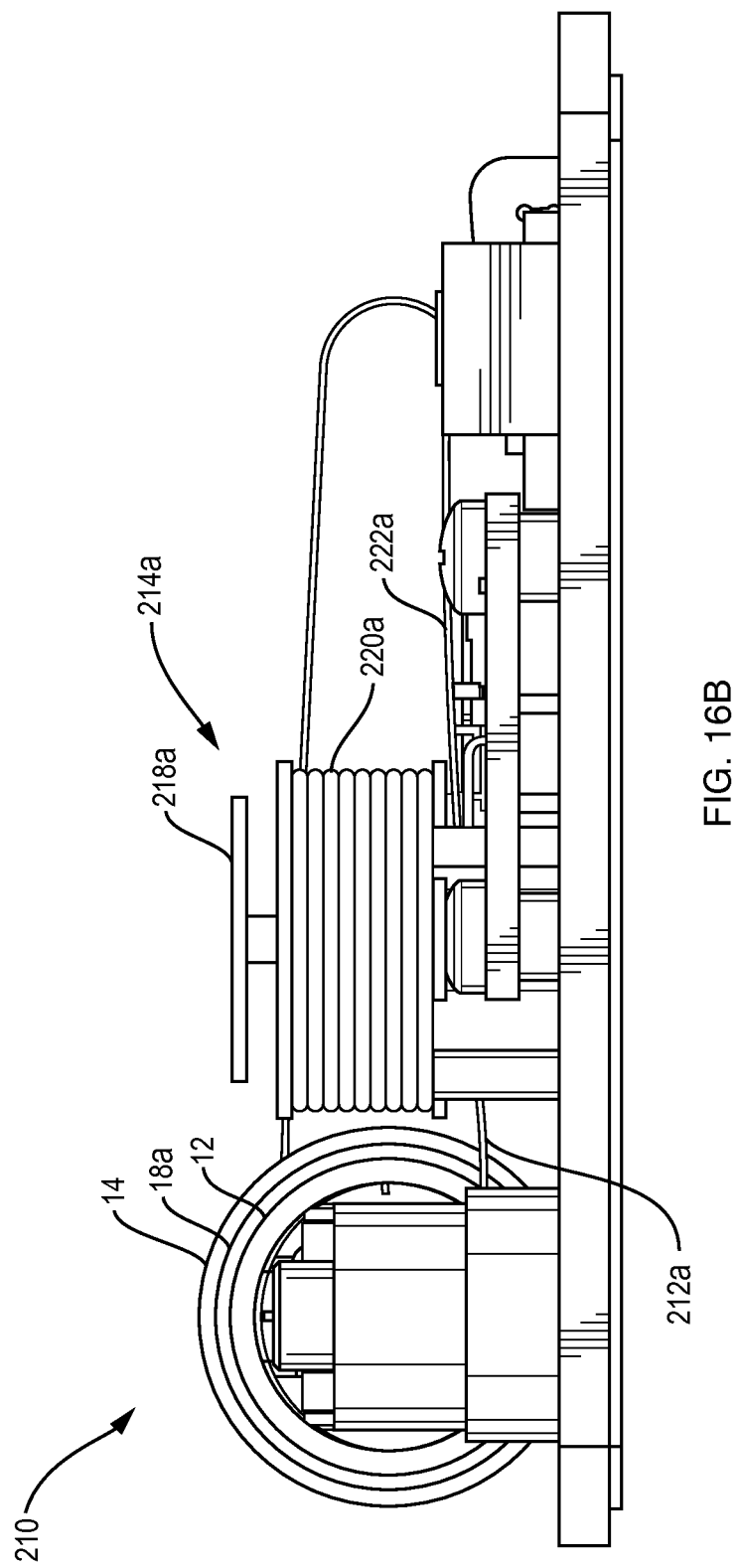
Figure 16C:
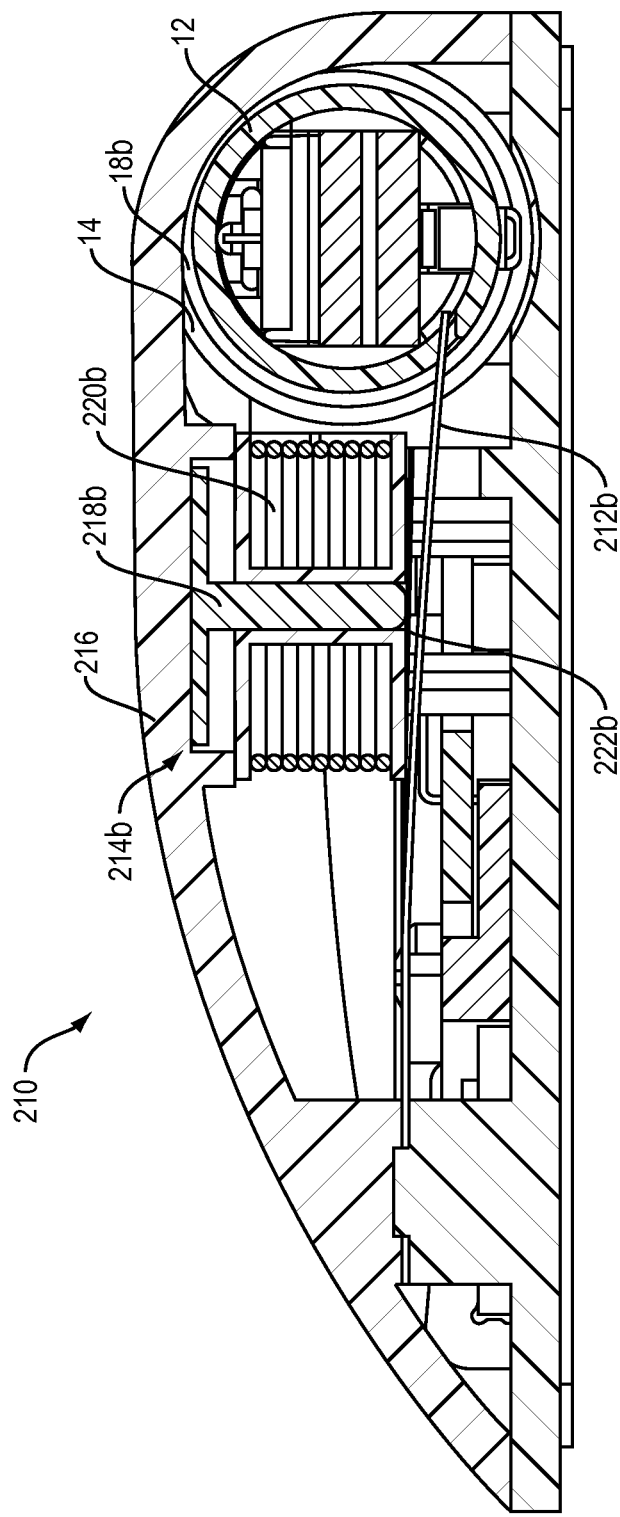
Figure 16D:
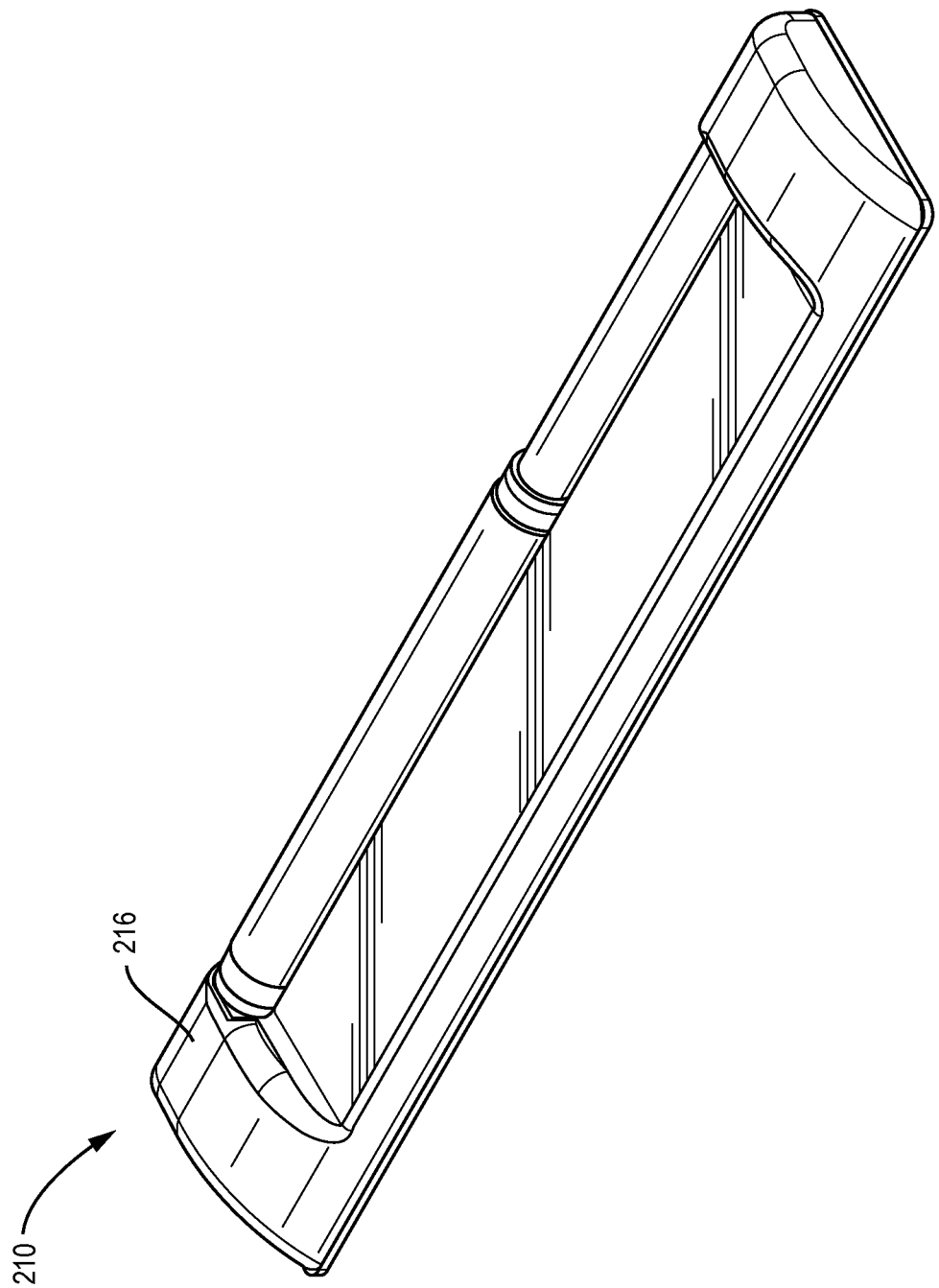
FIG. 16d comprises a view of the pointing device incorporating a pair of solenoids of FIG. 16a including a cover.

Referring now to FIGS. 16*a-d* an embodiment of a pointing device 210 incorporating a pair of solenoids 214*a* and 214*b* is shown. Each solenoid 214*a* and 214*b* include a respective plunger 218*a* and 218*b*, coil 220*a* and 220*b* and plunger return spring 222*a* and 222*b*. The roller assembly comprising central housing 12, sleeve 14, bushings 18*a* and 18 are supported by solenoids 214*a* and 214*b*, which are located proximate the ends of central housing 12 and are in mechanical communication with leaf springs 212*a* and 212*b*. When a force is applied by the user in a generally downward direction on the roller assembly, the solenoid plunger(s) deflect as do leaf springs 221*a* and 22*b*. The amount of force required can be adjusted by leaf spring force adjustment 224. The downward movement triggers one or more switches indicating that a click operation is underway. Also shown in FIG. 16*d* is a cover 216, which surrounds portions of the inner sensor pointing hardware and protects the pieces from dust, dirt, moisture and the like as well as providing various alternate switch layouts. Different covers and different switch layouts could also be included.

Figure 17A:
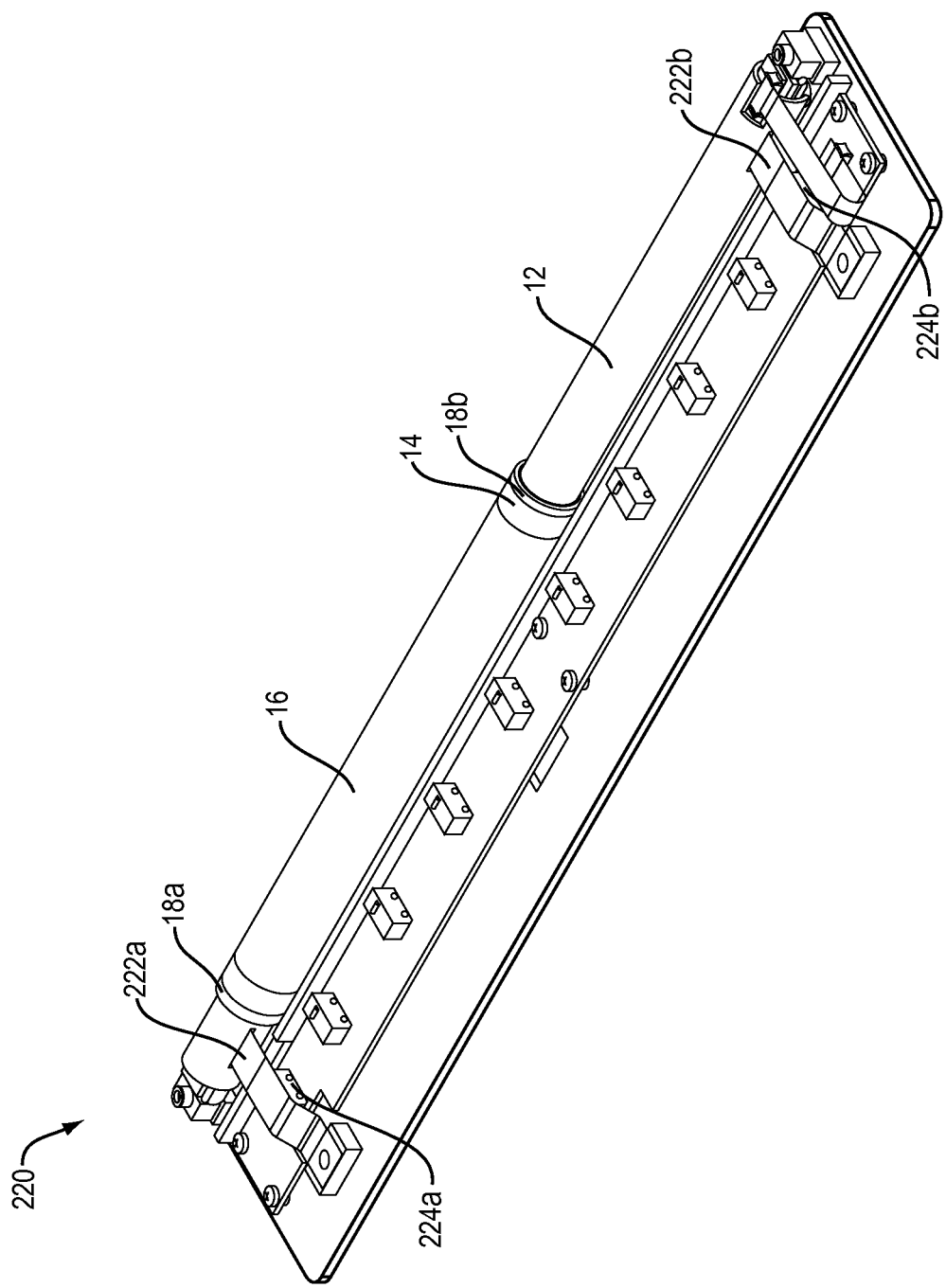
FIG. 17a comprises a view of the pointing device incorporating a pair of leaf springs and switches.
Figure 17B:
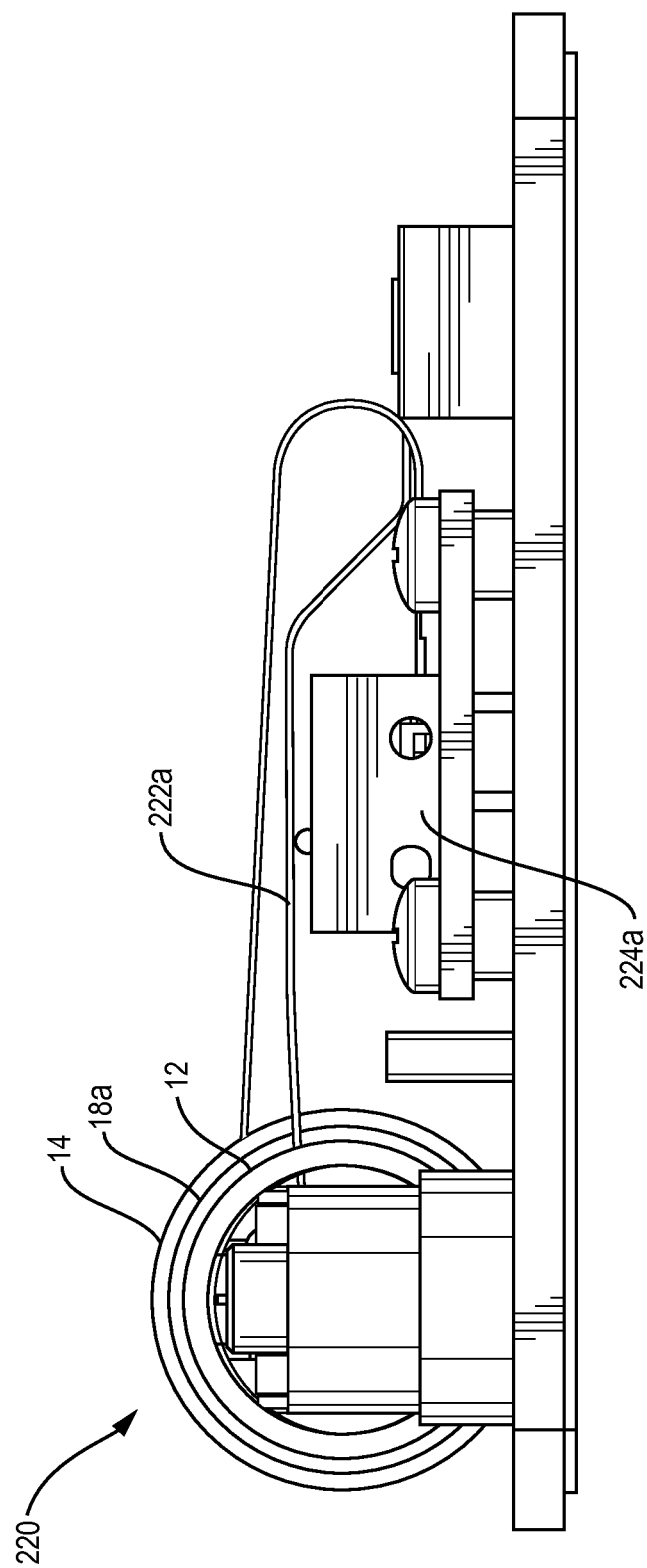

Referring now to FIGS. 17*a-b* an embodiment of an inner sensor pointing device 220 incorporating a pair of leaf springs 222*a* and 222*b* is shown. The roller assembly comprising central housing 12, sleeve 14, bushings 18*a* and 18 are supported by leaf springs 202*a* and 202*b*, which are located proximate the ends of central housing 12. When a force is applied by the user in a generally downward direction on the roller assembly, the leaf springs deflect. The downward movement triggers one or more switches 224*a* and 224*b* (located externally from the roller assembly) indicating that a click operation is underway.

Figure 18A:
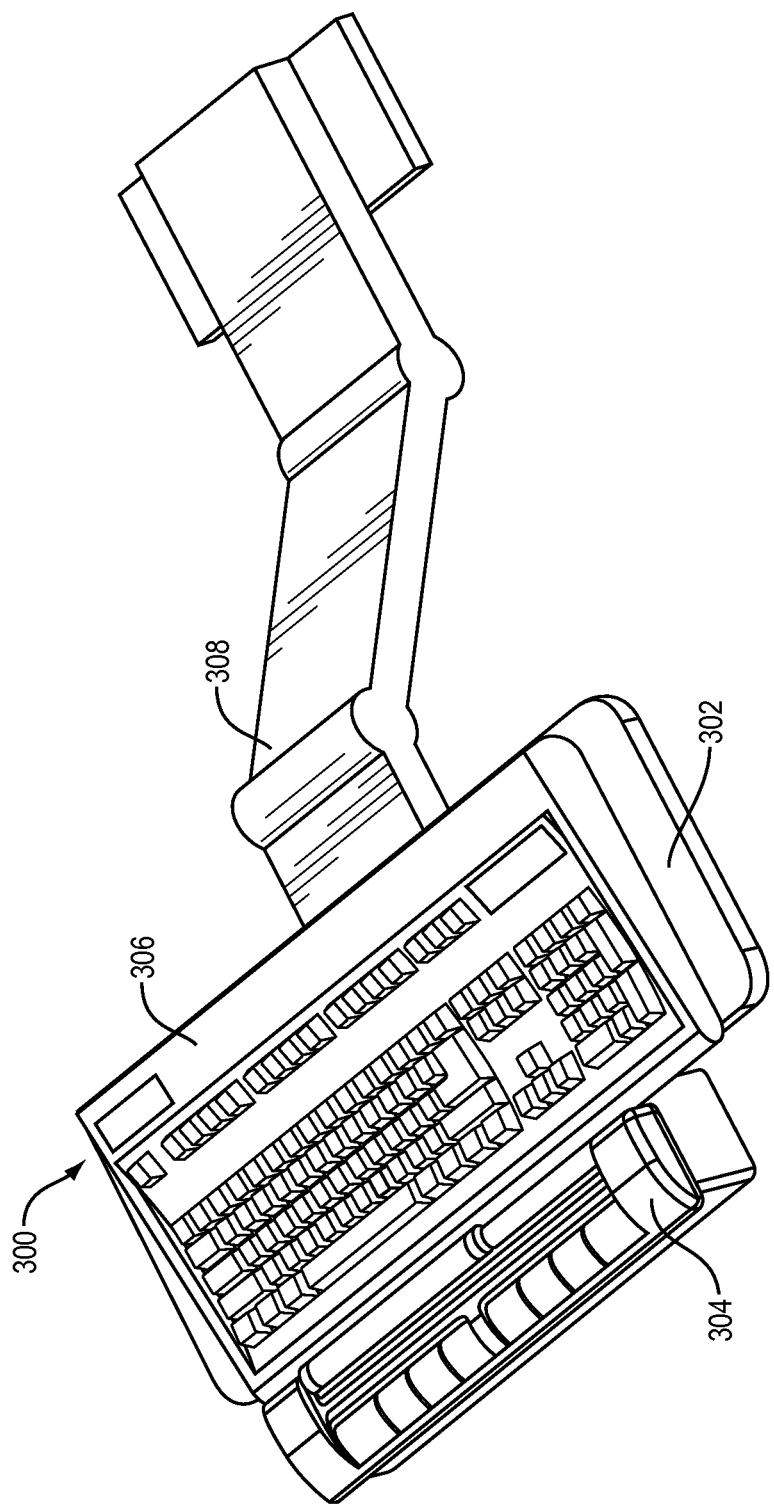
FIG. 18a comprises a view of a first embodiment of a keyboard tray with an integral pointing device.
Figure 18B:
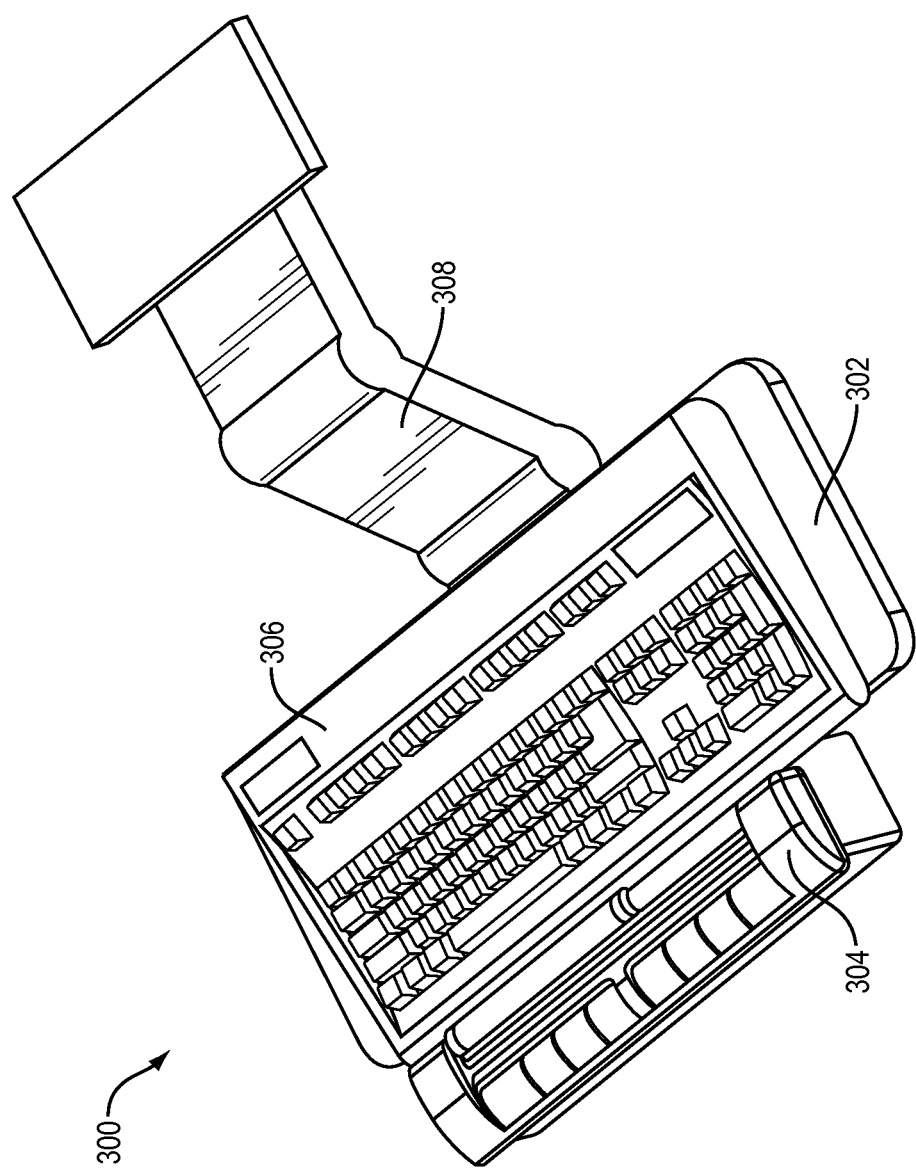
FIG. 18b comprises a view of a second embodiment of a keyboard tray with an integral pointing device.

FIGS. 18*a* and 18*b* show a further embodiment which comprises a keyboard tray 302 with an integral sensor pointing device 304. The embodiment shown in FIG. 18*a* attaches over a desk or stand, while the embodiment shown in FIG. 18*b* attaches under a desk or stand. A keyboard 306 can be positioned on the keyboard tray 302 and adjacent the pointing device 304. The keyboard tray is in mechanical communication with a desk or stand by way of keyboard tray arm 308 which allows for positioning of the keyboard tray 302 and pointing device 304 at an optimal location by the user.

Figure 19A:
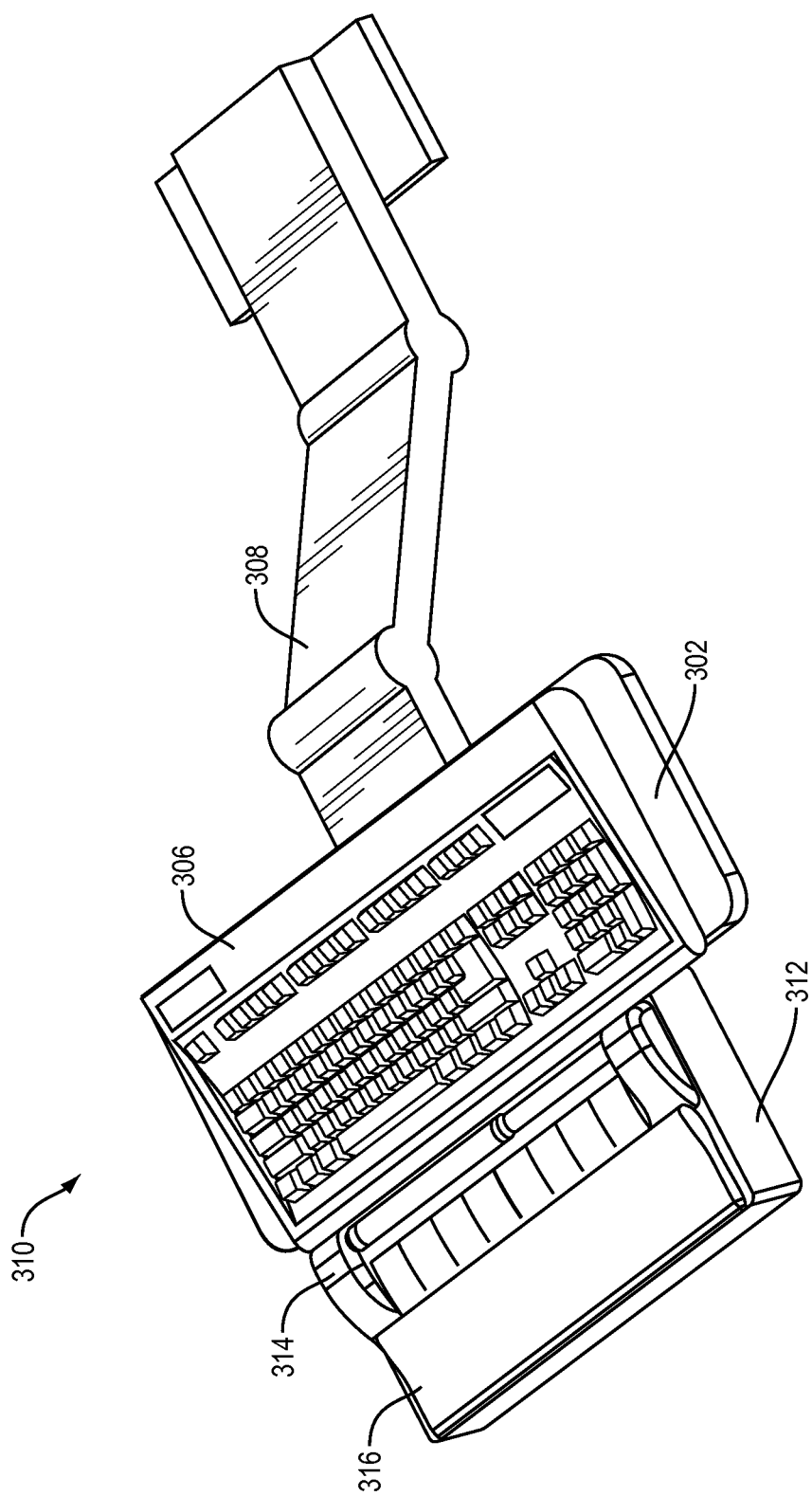
FIG. 19a comprises a view of a first embodiment of a keyboard tray with an integral pointing device and wrist support assembly.
Figure 19B:
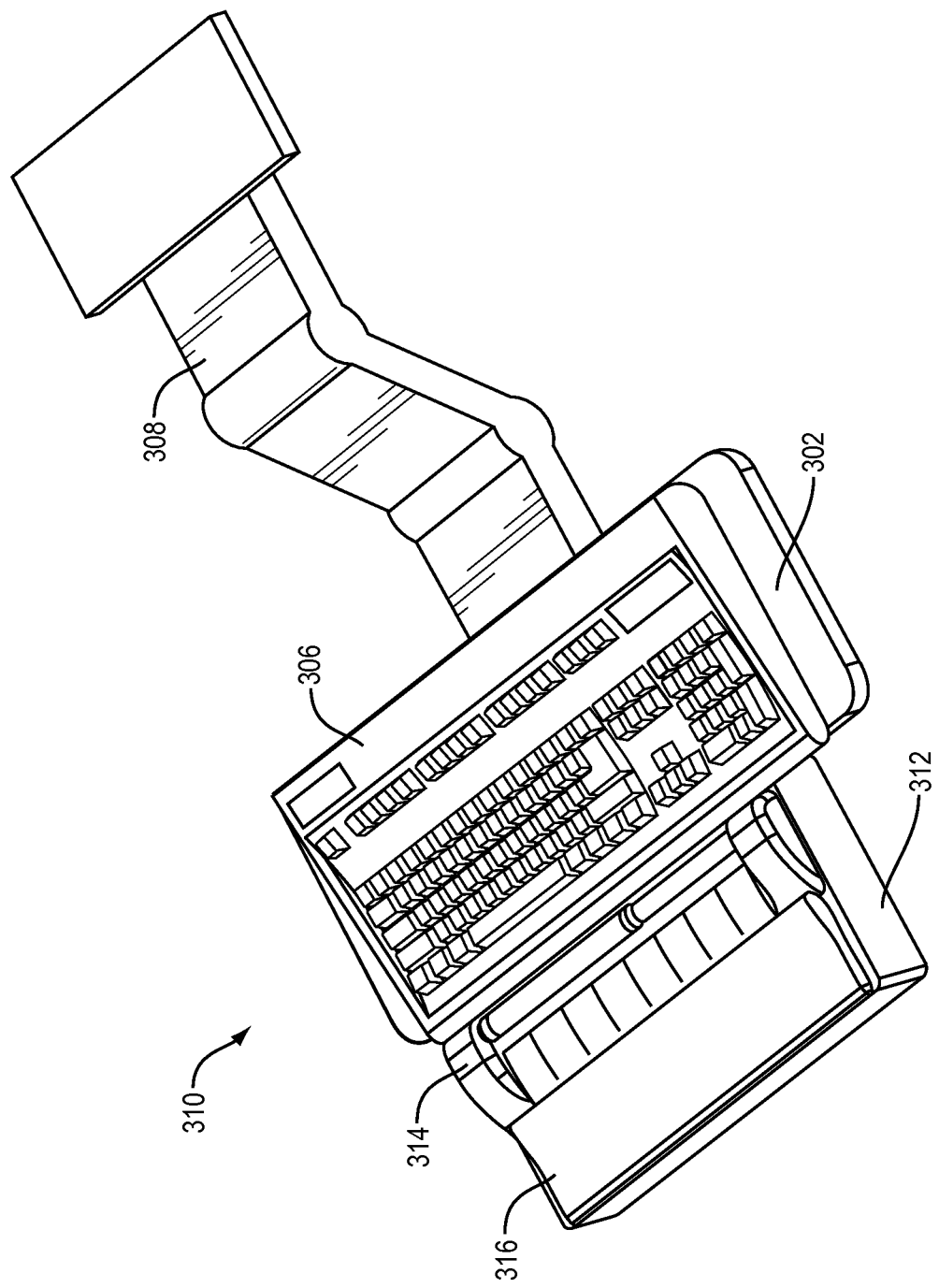
FIG. 19b comprises a view of a second embodiment of a keyboard tray with an integral pointing device and wrist support assembly.
Figure 20A:
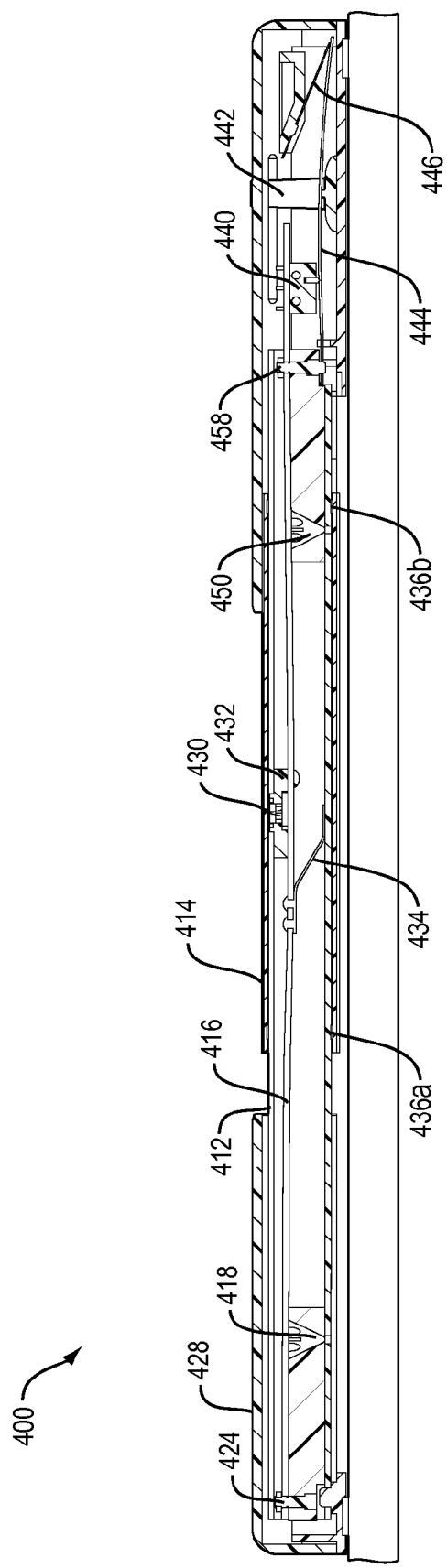
FIG. 20a comprises a cross-sectional view of another embodiment of an inner-sensor based pointing device.

FIGS. 19*a* and 19*b* show a further embodiment which comprises a keyboard tray 302 with a pointing device and wrist support assembly 312. The pointing device and wrist support assembly 312 includes a pointing device 314 and a wrist support 316. The embodiment shown in FIG. 19*a* attaches over a desk or stand, while the embodiment shown in FIG. 19*b* attaches under a desk or stand. A keyboard 306 can be positioned on the keyboard tray 302 and adjacent the pointing device and wrist support assembly 312. The keyboard tray is in mechanical communication with a desk or stand by way of keyboard tray arm 308 which allows for positioning of the keyboard tray 302 and pointing device 304 at an optimal location by the user Referring now to FIG. 20A, a first embodiment of a pointing device 400 is shown. The pointing device 400 includes a central housing 412. The central housing 412 contains additional parts, discussed in detail below. While central housing 412 is shown as generally tubular in the drawings, the central housing could also include shapes having a generally circular cross-section; a cross-section having at least one flat surface and at least one curved surface; and a cross-section having at least three rounded corners.

The pointing device 400 also includes a sleeve 414 which fits over a portion of central housing 412. Sleeve 414 is rotatable about a portion of the central housing, and is also slidable along a length of the central housing 412. Sleeve 414 may be supported by bushings 436*a* and 436*b*. Sleeve 414 may also include a grip.

The inner sensor pointing device 400 in this embodiment includes a sensor 430 mounted in a sensor housing 432 attached to a circuit board 416. The sensor 430 is shown as a laser sensor, though other types of sensors, including but not limited to an optical sensor or a rollerball, could also be used. A retainer spring 434 maintains the circuit board 416 within the central housing 412, in conjunction with first stud 424 and second stud 458. Also included are first end sensor 418 and second end sensor 450. A downward force provided by the user triggers pick switch 440. The amount of force necessary to trigger pick switch 440 is adjustable by operation of pick adjuster 442 in conjunction with first spring 444 and second spring 446. A cover 428 surrounds various pieces of the inner sensor pointing device.

Figure 20B:
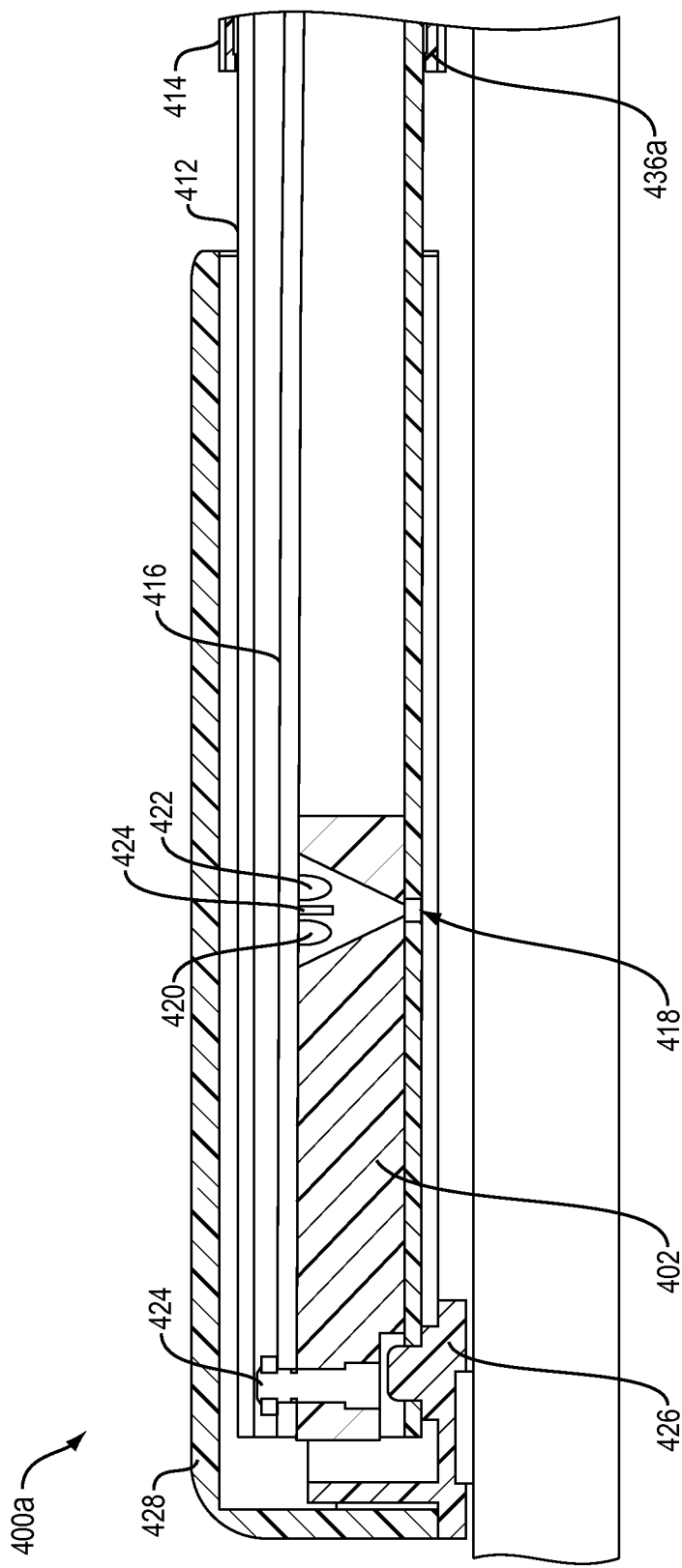

FIG. 20B depicts a cross-sectional view of a left hand portion of the inner sensor pointing device 400*a*. The central housing 412 has an opening which permits the central housing to rest on a pivot 426. When the sleeve 414 is pressed downward, the sleeve 414 and central housing 412 pivots about the pivot 426 to emulate the action of a user performing a "primary" click operation, similar to a left-clicking of a conventional mouse switch. This click operation may be used, for example, to perform a drag and drop operation with the pointing device. A typical downward force (also referred to as a "pick force") to achieve the click operation is generally 50 to 120 grams of force, though this could be adjusted by a user to achieve an optimal required force.

The central housing has a printed circuit board 416 disposed entirely within. Located between the circuit board 416 and the central housing is a block 402 which is held in mechanical communication with circuit board 416 by first stud 424.

Also shown is the first end sensor 418 which includes a transmitter 420, a receiver 422 and a divider 424. In operation, the first end sensor 418 detects when the sleeve 414 has been moved so that the sleeve 414 covers the end sensor 418. When the sleeve is not covering the end sensor 418, light from transmitter 420 travels through the conical shaped cavity and passes through the opening at the distal end thereof. The light travels down to a table, desk or other support structure and is reflected back outside of the opening in the cavity. The conical shape of the cavity is defined such that the light from the transmitter is focused so the light does not reflect back into the central housing when the sleeve is not covering the central housing. As such, receiver 422 does not detect the light—therefore the sleeve is not positioned over the end sensor 418. When the sleeve 414 is moved such that the sleeve 414 covers the opening at the end of the conical cavity, the light from transmitter 420 is reflected back inside the conical cavity and is detected by receiver 422, indicating the presence of the sleeve 414 covering the end sensor 418. The divider 424 is optional and may be used to prevent the occurrence of cross talk, wherein the receiver would other-wise detect the light from transmitter 420. The end sensor 418 is shown in this embodiment as an optical type sensor. The receiver 422 could alternately be placed outside of the central housing 412 and use through-beam detection to detect when the sleeve 414 has been moved past the end sensor 418. While an optical end sensor is shown, it should be appreciated that other sensors or switches could also be used (e.g., a proximity switch, a hall-effect sensor, a capacitive switch or sensor). One advantage of using an optical end sensor is that the user doesn't feel the end of travel of the sleeve 414. The end sensor 418 provides a speed adjustment of the pointer on the display with respect to movement of the sleeve 414 about the central housing 412. Before the end sensor detects movement of the sleeve 414 past the end sensor 418, a given amount of sleeve movement correlates to a given amount of pointer movement on a display. Once the end sensor 418 detects the presence of the sleeve 414, a larger amount of pointer movement is provided for a same given amount of sleeve movement.

Figure 20C:
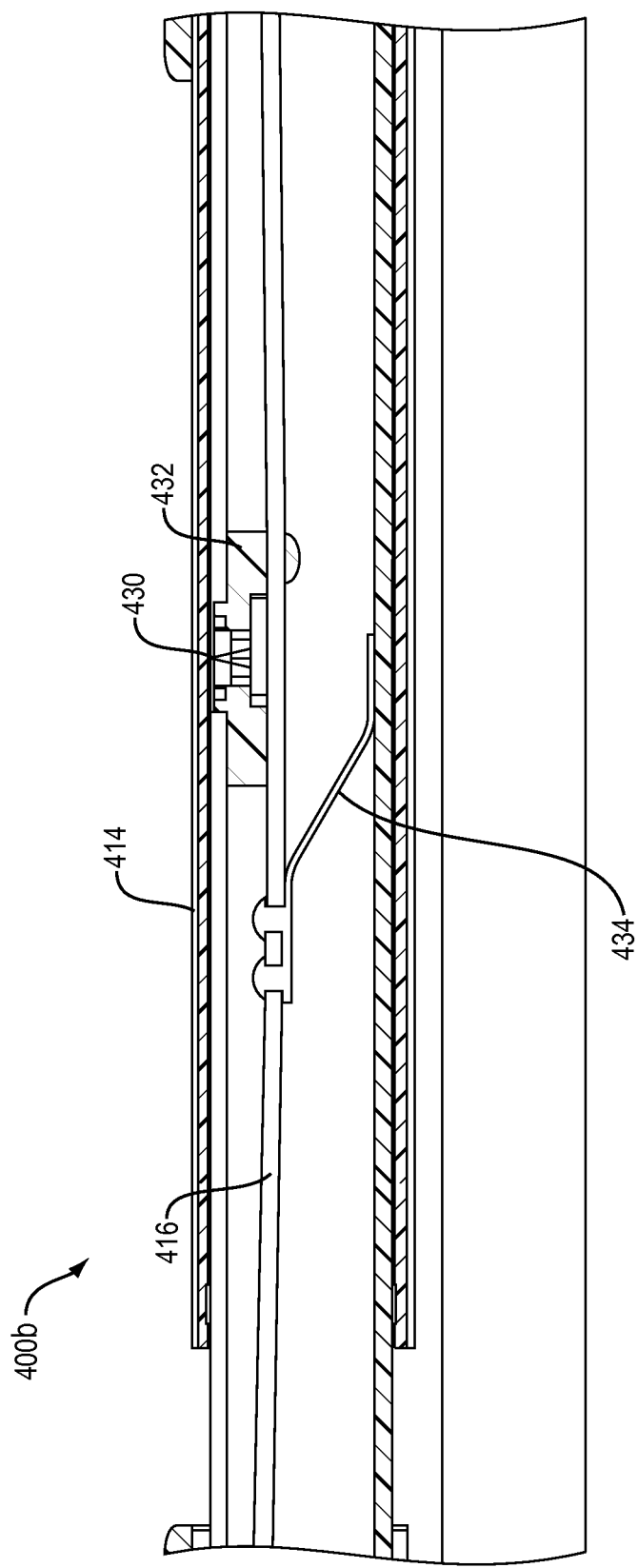

Referring now to FIG. 20C, a central portion 400b of the inner sensor pointing device is shown. A sensor 430 is shown disposed on circuit board 416 and is secured in place by sensor housing 432. In a particular embodiment the sensor is realized as a laser sensor, though other embodiments could use different types of sensors. The sensor is used to detect any rotational and/or sliding movement of the sleeve 414 with respect to the central housing 412. A retainer spring 434 is used to bias the sensor 430 and sensor housing 432 in place within central housing 412. A portion of the sensor housing 432 extends into an aperture within the central housing 412 such that the sensor 430 can detect movement of sleeve 414, and is locked in place by operation of retainer spring 434.

Figure 20D:
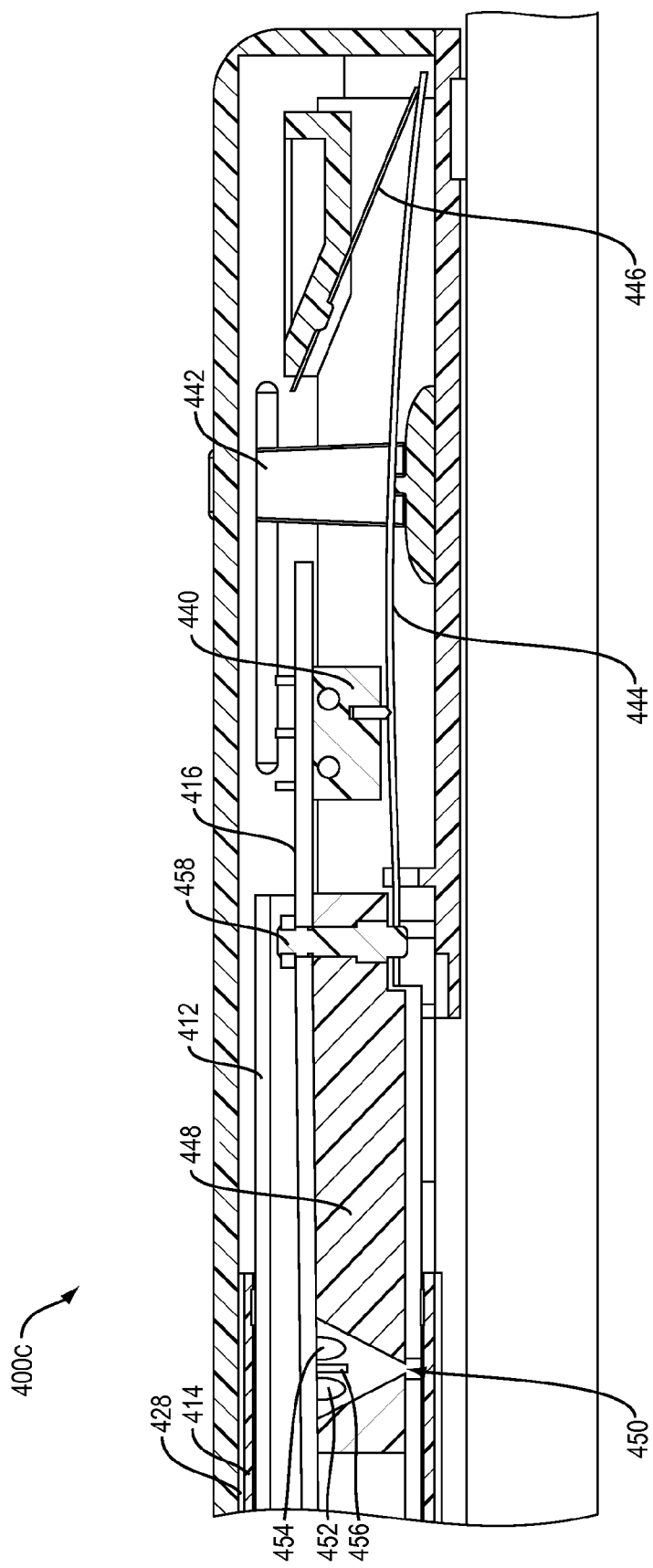

Referring now to FIG. 20D, a cross-sectional view of a right hand portion of the inner sensor pointing device 400c is shown. Similar to the left hand side described with respect to FIG. 1B, located between the circuit board 416 and the central housing is a block 448 which is held in mechanical communication with circuit board 416 by second stud 458. Also shown is the second end sensor 450 which includes a transmitter 452, a receiver 454 and a divider 456. In operation, the second end sensor 450 detects when the sleeve 414 has been moved so that the sleeve 414 covers the end sensor 450. When the sleeve is not covering the end sensor 450, light from transmitter 452 travels through the conical shaped cavity and passes through the opening at the distal end thereof. The light travels down to a table or desk and is reflected back outside of the opening in the cavity. The conical shape is defined such that the light from the transmitter is focused so the light does not reflect back into the central housing when the sleeve is not covering the central housing. As such, receiver 454 does not detect the light—therefore the sleeve is not positioned over the end sensor 450. When the sleeve is moved such that the sleeve covers the opening at the end of the conical cavity, the light from transmitter 452 is reflected back inside the conical cavity and is detected by receiver 454, indicating the presence of the sleeve covering the end sensor. The divider 456 is optional and is used to prevent the occurrence of cross talk, wherein the receiver 454 would otherwise detect the light from transmitter 452. Each end sensor (418 of FIG. 1B and 450 of FIG. 1D) are shown displaced a predetermined distance along the central housing 412 from the ends of the sleeve 414 when the sleeve 414 is at a dead center location on the central housing 412. This is done to allow for a certain amount of pointer movement before an accelerated pointer movement is utilized. Alternately, the end sensors 418 and 450 could be placed so that they are adjacent the ends of the sleeve 414 when the sleeve 414 is at dead center, to help center the detection and location of the sleeve 414 along the central housing 412.

A pick adjuster assembly is shown, which includes a pick adjuster 442, a first spring 444 and a second spring 446. When the sleeve 414 is pressed downwardly, the sleeve 414 and central housing 412 pivot about the pivot and activate the pick switch 440. The amount of force necessary to activate the pick switch is adjustable by operation of pick adjuster 442 which is in communication with first spring 444. The first spring 444 is connected at one end to the stud which is attached to block 448, while the other end is in mechanical communication with second spring 446. The second spring 446 has a first end in communication with the first spring 444, while the other end is attached to a block. The pick adjuster 442 is movable in a horizontal direction which results in a change in the amount of force required to trigger pick switch 440. This is particularly useful when performing different operations with the inner sensor based pointing device. When a user is performing several drag-and-drop operations, it may be desirable to have the pick force set high such that elements are not unintentionally dropped while being dragged. On the other hand, when a user is performing several click type operations with little or no dragging operations, it may be desirable to have the pick force set low such that it is relatively easy to pick objects.

Figure 21:
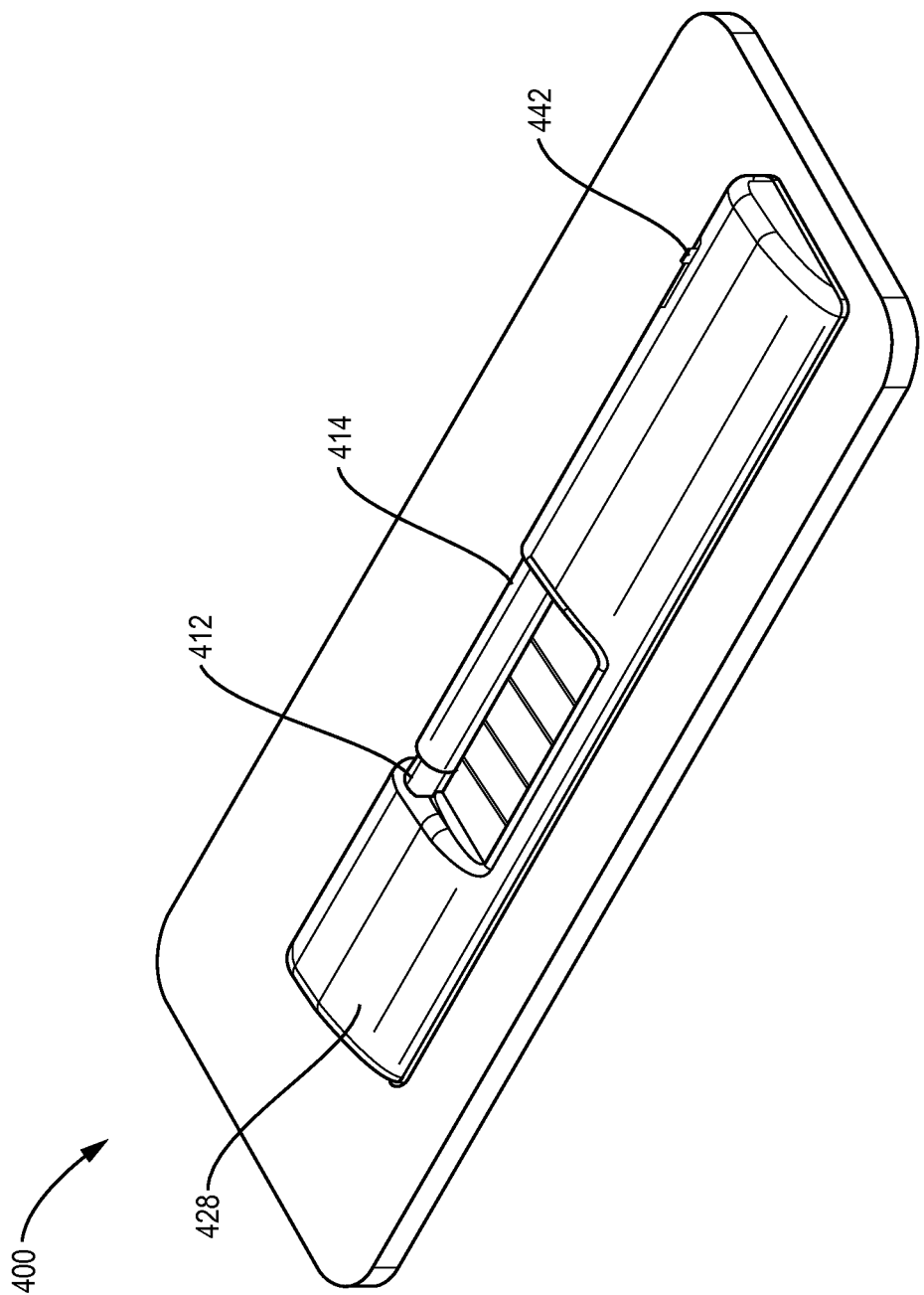

FIG. 21 depicts an isometric view of the inner sensor pointing device 400. As shown, cover 428 covers a portion of central housing 412 and sleeve 414 as well as pick adjuster 442.

In another embodiment the pointing device is comprised of a hollow tube having a sleeve disposed surrounding a portion of the tube, wherein the sleeve is rotatable in part about at least a portion of the tube and wherein the sleeve is slidable along a generally horizontal axis about the portion of the tube. The pointing device further includes a sensor disposed along a surface of the tube, the sleeve positioned surrounding the sensor, and wherein the sensor is capable of detecting movement of the sleeve relative to the tube.

In still another embodiment, the pointing device includes a central housing having an aperture, the central housing having a generally tubular form and a sleeve disposed surrounding a portion of the central housing, wherein the sleeve can concurrently (i) rotate about the portion of the central housing and (ii) slide along a generally horizontal axis about the portion of the central housing. The pointing device further includes a sensor disposed in the central housing and aligned with the aperture, the sleeve positioned surrounding the sensor, and wherein the sensor is capable of concurrently detecting (iii) rotational movement of the sleeve relative to the central housing and horizontal movement of the sleeve relative to the central housing. Additionally, the pointing device includes a circuit in communication with the sensor, the circuit capable of transmitting data to a computer regarding the rotational movement and horizontal movement.

In a particular embodiment, a mode referred to herein as "power scroll" can be entered. When the sleeve is at or near the end of travel on one side or the other of the central housing, a power scroll mode is entered, wherein the sleeve can be used as a scroll wheel to quickly scroll through a document. Moving the sleeve away from the end of the central housing results in exiting the power scroll mode.

Figure 22A:
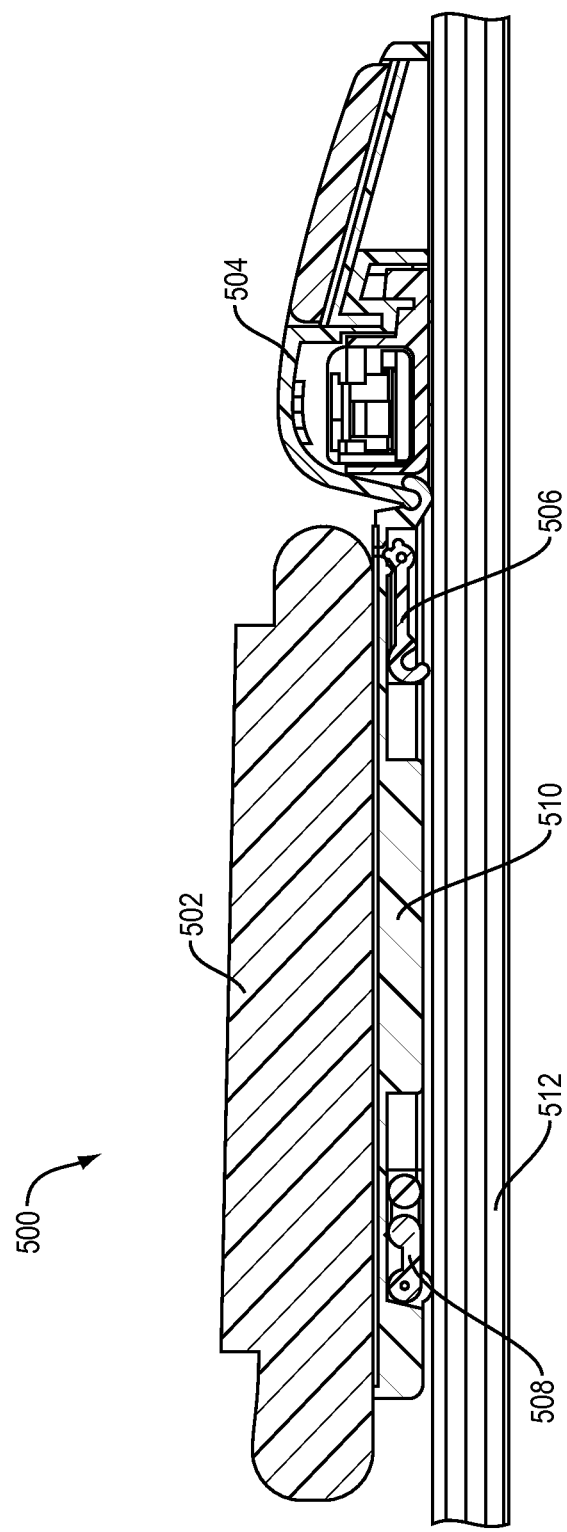
FIG. 22a comprises a cross-sectional view of a keyboard platform assembly having keyboard platform risers in a closed position.

FIG. 22a comprises a cross-sectional view of a keyboard platform assembly 500. A keyboard platform 510 is shown supporting a keyboard 502. Also shown is a pointing device 504, which rests on a lip of the keyboard platform 510. Both the keyboard platform 510 and the pointing device 504 rest on a table, desk or similar support structure 512. Keyboard platform 510 includes a front keyboard platform riser 506, in a closed (lowest) position. Keyboard platform 510 further includes a rear keyboard platform riser 508, also shown in a closed position.

Figure 22B:
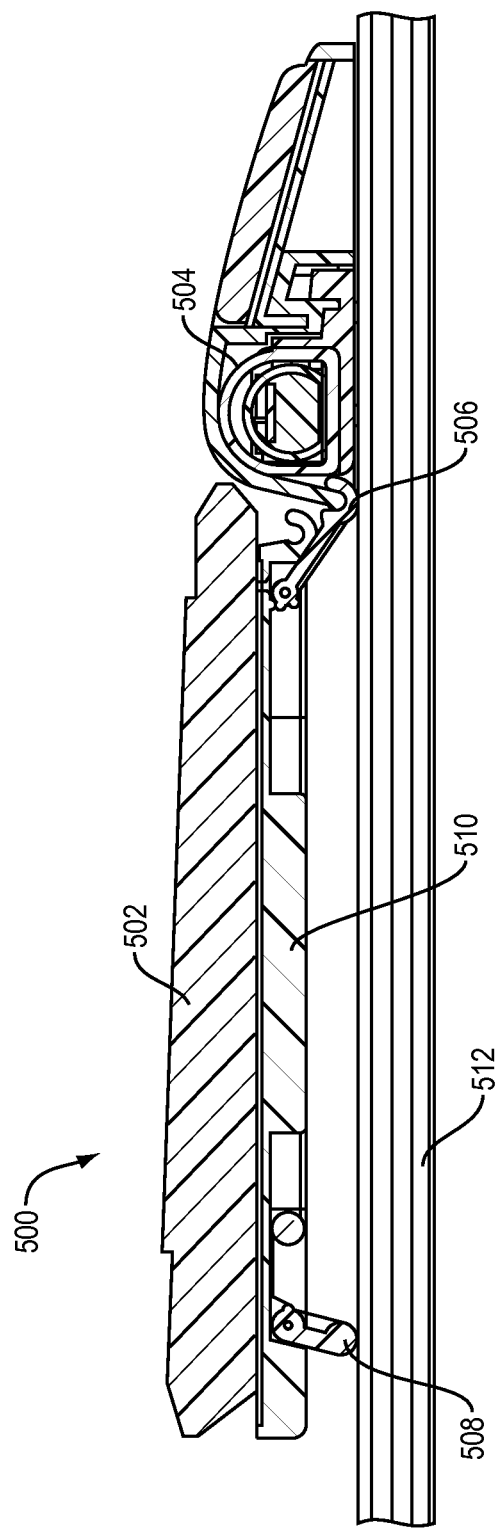
FIG. 22b comprises a cross-sectional view of a keyboard platform assembly having keyboard platform risers in an open position.

FIG. 22b comprises a cross-sectional view of a keyboard platform assembly having keyboard platform risers in an open position. In this example, front keyboard platform riser 506 has been extended into an open position, as has rear keyboard platform riser 508. As such, the keyboard platform 510 has been relocated to a position above table 512. The keyboard 514 here is a lower profile keyboard than keyboard 502 in FIG. 22a, and needs to be raised in order to provide a comfortable working position for the user when used with the pointing device 504.

Figure 23A:
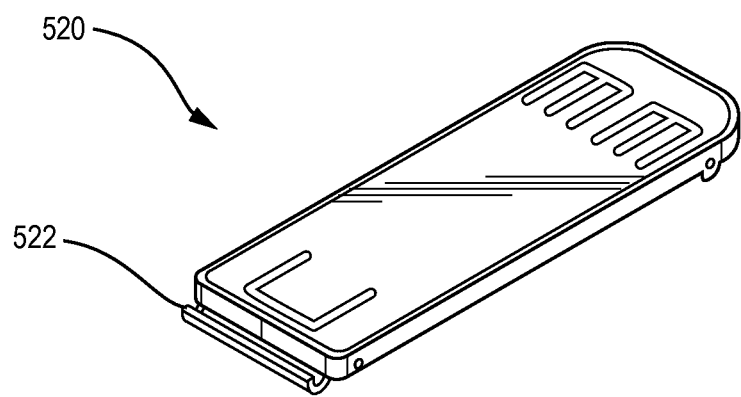
FIG. 23a comprises an isometric view of a keyboard platform riser in a closed position.
Figure 23B:
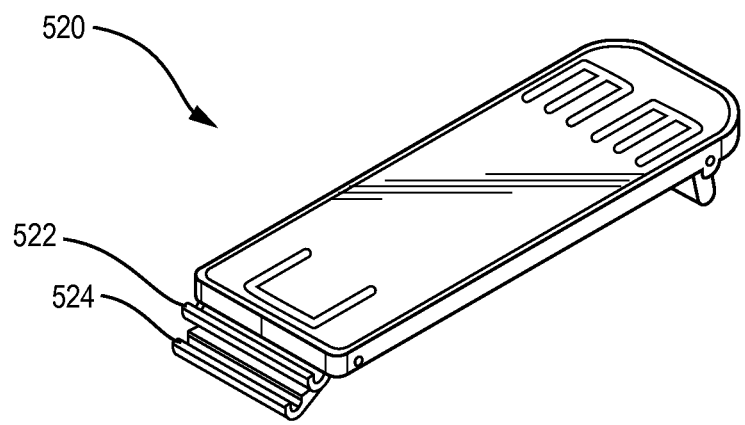
FIG. 23b comprises an isometric view of a keyboard platform riser in an open position.

Referring now to FIGS. 23a-23e a particular embodiment of a keyboard platform riser 520 is shown. In FIG. 23a, a top isometric view of keyboard platform riser 520 is shown in a closed position. A lip 522 extends from a first end of the keyboard platform riser 520. In FIG. 23b, a top isometric view of the keyboard platform riser 520 is shown in an open position. A first end of the keyboard platform riser 520 includes an extended lip 524 protruding from the first end and a leg 526 extending from a second end.

Figure 23C:
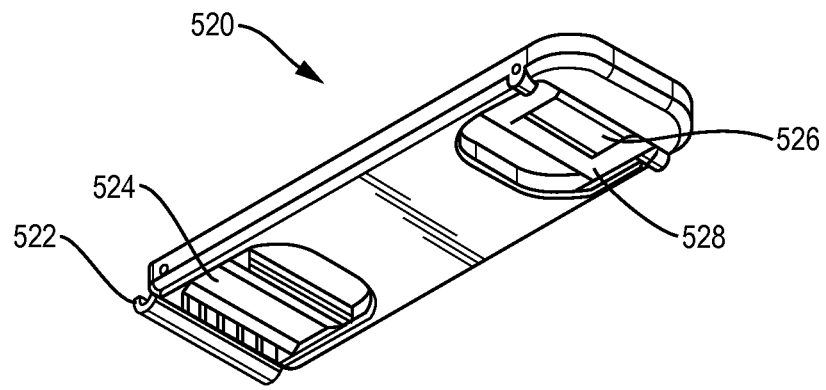
Figure 23D:
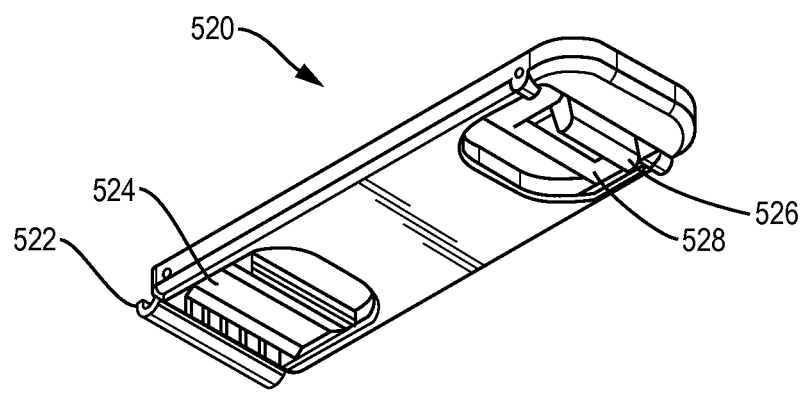
FIG. 23d comprises an isometric bottom view of the keyboard platform riser having a first end in a closed position and a second end in an open position.
Figure 23E:
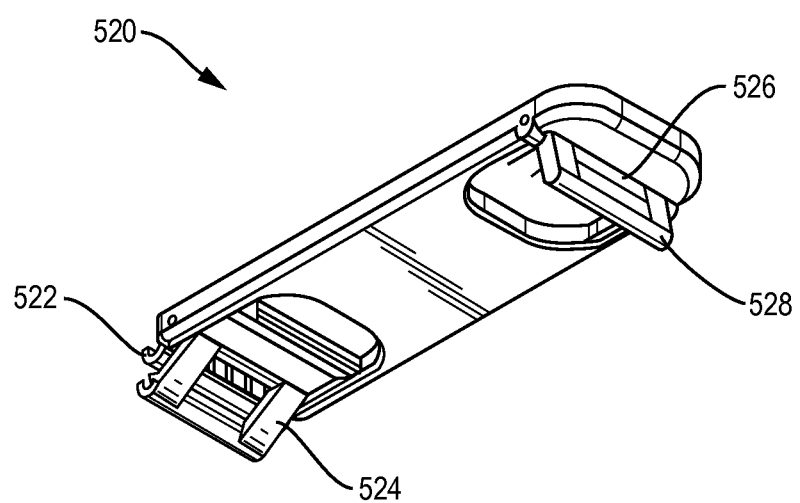
FIG. 23e comprises an isometric bottom view of the keyboard platform riser having a first end in an open position and a second end in an open and extended position.

FIG. 23c shows an isometric bottom view of the keyboard platform riser 520. In this view the lip 522 can be seen as well as the closed extended lip 524. The second end includes a closed leg 526 and a closed extended leg 528. FIG. 23d shows an isometric bottom view of the keyboard platform riser 520 having a first end in a closed position and the second end having a leg 526 in an open position. FIG. 23e depicts an isometric bottom view of the keyboard platform riser 520 wherein the first end has the extended lip 524 in an open position and a second end having the extended leg 528 in the open position.

Figure 24A:
FIG. 24a comprises a side view of a keyboard platform having front and rear keyboard platform risers in a closed position.
Figure 24B:
FIG. 24b comprises a side view of a keyboard platform having front keyboard platform risers in a closed position and rear keyboard riser in an open position.
Figure 24C:
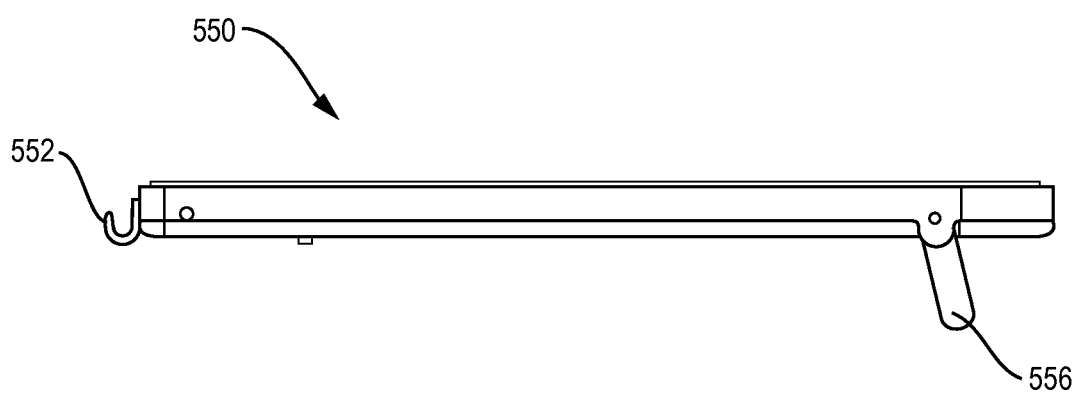
FIG. 24c comprises a side view of a keyboard platform having front keyboard platform risers in a closed position and rear keyboard riser in an open and extended position.

Referring now to FIGS. 24a-f, side views of the keyboard platform 550 in a variety of settings are shown. In FIG. 24a the keyboard platform 550 is shown in a lowered position. In FIG. 24b the keyboard platform 550 is shown having a front keyboard platform risers in a closed position and rear keyboard platform risers 554 in an open position, while FIG. 24c shows the keyboard platform 550 having front keyboard platform risers in a closed position and the rear keyboard risers 556 in an open and extended position.

Figure 24D:
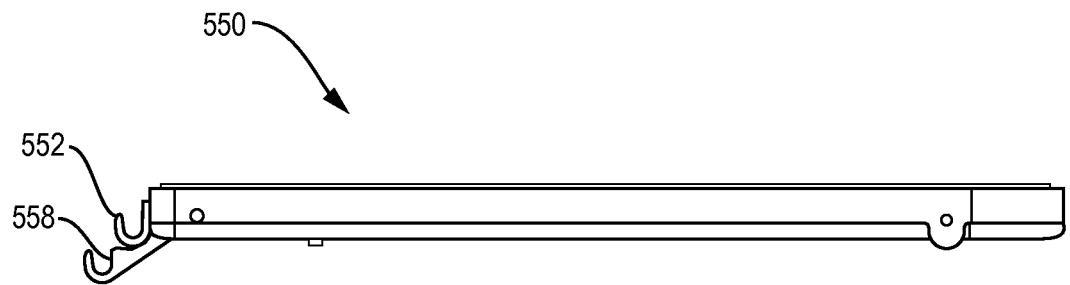
FIG. 24d comprises a side view of a keyboard platform having front keyboard platform risers in an open position and rear keyboard riser in a closed position.
Figure 24E:
FIG. 24e comprises a side view of a keyboard platform having front keyboard platform risers in an open position and rear keyboard riser in an open position.
Figure 24F:
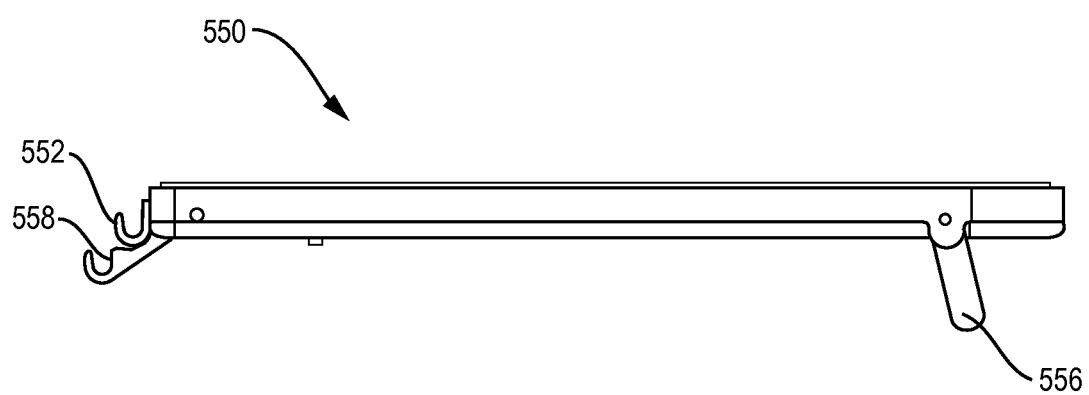
FIG. 24f comprises a side view of a keyboard platform having front keyboard platform risers in an open position and rear keyboard riser in an open and extended position.

In FIG. 24d the keyboard platform 550 is shown with the front keyboard platform risers 558 in an open position below lip 552. The rear keyboard platform risers are in a closed position. In FIG. 24e the keyboard platform 550 is shown having the front keyboard platform risers in an open position and rear keyboard platform risers 554 in an open position, while FIG. 24f shows the keyboard platform 550 having front keyboard platform risers in an open position and the rear keyboard risers 556 in an open and extended position.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

As described above, certain embodiments include an inner sensor, while other embodiments can include an inner sensor or an external sensor. While the embodiments described above utilize the pointing device in an orientation wherein left-to-right movement of the sleeve results in a corresponding left-to-right movement of the pointer on a display and wherein rotation of the sleeve results in up-and-down movement of the pointer on the display, alternate orientations could also be used. One such alternate orientation is one wherein rotation of the sleeve results in a corresponding left-to-right movement of the pointer on a display and wherein front-to-back or up-and-down movement of the sleeve results in up-and-down movement of the pointer on the display.

In some embodiment, when a downward force is applied to the sleeve to affect a click operation, an audible click sound may be supplied to provide the user with an audible feed back affirming the operation. The sound could be provided by a piezoelectric device or a voice coil, positioned internal or external to the central housing.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A pointing device comprising:
   a tube;
   a sleeve disposed to fit over a portion of the tube, wherein the sleeve is rotatable about the tube and wherein the sleeve is slideable along a generally horizontal axis of the tube; and
   a sensor disposed along a surface of the tube, wherein the sensor is configured to detect rotational movement of the sleeve relative to the sensor and wherein the sensor is configured to detect axial movement of the sleeve relative to the sensor.

2. The pointing device of claim 1, further comprising a circuit in communication with the sensor, the circuit capable of transmitting data to a processor regarding the detected movement of the sleeve.

3. The pointing device of claim 2, wherein the circuit is disposed within the tube.

4. The pointing device of claim 3, wherein the circuit comprises a circuit board and further comprises a pick switch disposed on the circuit board, the pick switch configured to be activated by a downward pressure being applied to the sleeve so as to provide a primary click operation.

5. The pointing device of claim 4, further comprising a pick adjuster assembly, the pick adjuster assembly in communication with the pick switch, the pick adjuster assembly configured to be movable by a user to select a required force for triggering the pick switch.

6. The pointing device of claim 1, further comprising at least one end sensor capable of detecting movement of the sleeve beyond a predetermined location of the tube.

7. The pointing device according to claim 6, wherein the at least one end sensor is chosen from an optical sensor, a hall effect sensor, and a capacitive sensor.

8. The pointing device of claim 1, further comprising a pivot assembly comprising a pivot disposed beneath a portion of the tube, wherein an opening in the tube fits over a top section of the pivot such that the tube is capable of pivoting about the pivot.

9. The pointing device of claim 1, further comprising at least one bushing disposed between the sleeve and the tube.

10. The pointing device of claim 1, wherein the sleeve is comprised of a flexible material selected from the group consisting of metal, plastic, rubber, cloth and paper.

11. The pointing device of claim 1, wherein the sleeve is configured to conform to a shape of the tube.

12. The pointing device of claim 1, further comprising a carriage supporting the tube and a base, wherein the carriage is pivotable about the base.

13. The pointing device of claim 1, further comprising at least one flexure made of a deformable material secured to a base and supporting the tube.

14. The pointing device of claim 1, further comprising at least one leaf spring disposed between a base and the tube.

15. The pointing device of claim 14, wherein the at least one leaf spring is located proximate an end of the tube.

16. The pointing device of claim 1, further comprising at least one solenoid, the at least one solenoid supporting the tube.

17. The pointing device of claim 16, wherein the at least one solenoid comprises a plunger, a coil surrounding at least a portion of the plunger, and a plunger return spring.

18. The pointing device of claim 1, further comprising at least one end sensor arranged within the tube, the at least one end sensor configured for contactless detection of movement of the sleeve beyond a predetermined location of the tube.

19. The pointing device according to claim 18, wherein the at least one end sensor is chosen from an optical sensor, a hall effect sensor, and a capacitive sensor.

20. The pointing device according to claim 18, wherein the sensor and the at least one end sensor are mounted on a common circuit board disposed within the tube.

21. The pointing device of claim 1, wherein the sensor is aligned with the aperture of the tube such that light provided by the sensor is directed through the aperture and upon a section of a surface of the sleeve exposed through the aperture.

22. A pointing device comprising:
a central housing having an aperture;
a sleeve disposed to fit over a portion of the central housing, wherein the sleeve is rotatable about the central housing and wherein the sleeve is slideable along a generally horizontal axis of the central housing;
a sensor disposed in the central housing and aligned with the aperture, wherein the sensor is configured to detect rotational movement of the sleeve relative to the sensor and wherein the sensor is configured to axial movement of the sleeve relative to sensor;
a circuit in communication with the sensor, the circuit capable of transmitting data to a processor regarding the detected movement of the sleeve.

23. The pointing device of claim 22, wherein the sensor is selected from the group consisting of a laser sensor and an optical sensor.

24. The pointing device of claim 22, further comprising at least one end sensor configured to detect axial movement, of the sleeve beyond a predetermined location on the central housing.

25. The pointing device according to claim 24, wherein the at least one end sensor is chosen from an optical sensor, a hall effect sensor, and a capacitive sensor.

26. The pointing device of claim 22, further comprising a pivot assembly comprising a pivot disposed beneath a portion of the central housing, wherein an opening in the central housing fits over a top section of the pivot such that the central housing is capable of pivoting about the pivot.

27. The pointing device of claim 22, wherein the circuit comprises a circuit board disposed within the central housing and comprises a pick switch disposed on the circuit board, the pick switch configured to be activated by a downward pressure being applied to the sleeve so as to provide a primary click operation.

28. The pointing device of claim 27, further comprising a pick adjuster assembly, the pick adjuster assembly in communication with the pick switch, the pick adjuster assembly configured to be movable by a user to select a required force for triggering the pick switch.

29. The pointing device of claim 22, further comprising at least one bushing disposed between the sleeve and the central housing.

30. The pointing device of claim 22, wherein the sleeve is comprised of a flexible material selected from the group consisting of metal, plastic, rubber, cloth and paper.

31. The pointing device of claim 22, wherein the sleeve is configured to conform to a shape of the central housing.

32. The pointing device of claim 22, further comprising a carriage supporting the central housing and a base, wherein the carriage is pivotable about the base.

33. The pointing device of claim 22, further comprising at least one flexure made of a deformable material that is secured to a base and supports the central housing.

34. The pointing device of claim 22, further comprising at least one leaf spring disposed between a base and the central housing.

35. The pointing device of claim 34, wherein the at least one leaf spring is located proximate an end of the central housing.

36. The pointing device of claim 22, further comprising at least one solenoid, the at least one solenoid supporting the central housing.

37. The pointing device of claim 36, wherein the at least one solenoid comprises a plunger, a coil surrounding at least a portion of the plunger, and a plunger return spring.

38. The pointing device of claim 22, further comprising at least one end sensor arranged within the central housing, the at least one end sensor configured for contactless detection of movement of the sleeve beyond a predetermined location of the central housing.

39. The pointing device according to claim 38, wherein the at least one end sensor is chosen from an optical sensor, a hall effect sensor, and a capacitive sensor.

40. The pointing device according to claim 39, wherein the sensor and the at least one end sensor are mounted on a common circuit board which is arranged within the central housing.

41. The pointing device of claim 22, wherein the circuit is disposed within the central housing.

42. The pointing device of claim 22, wherein the central housing is a hollow tube and the aperture is provided in an area of the surface of the tubular central housing.

43. The pointing device of claim 22, wherein the sensor is aligned with the aperture of the central housing such that light provided by the sensor is directed through the aperture and upon a section of a surface of the sleeve exposed through the aperture.

44. A pointing device comprising:
  a hollow tubular central housing having an aperture provided in an area of a surface of the tubular central housing;
  a sleeve disposed to fit over a portion of the tubular central housing and to surround the aperture, wherein the sleeve is rotatable about at least the portion of the tubular central housing and wherein the sleeve is slideable along a generally horizontal axis about at least the portion of the tubular central housing;
  a circuit disposed within the tubular central housing;
  a sensor disposed on the circuit within the tubular central housing, the sensor being positioned proximate to and aligned with the aperture, wherein the sensor is configured to detect rotational movement of the sleeve relative to the tubular central housing and wherein the sensor is configured to detect axial movement of the sleeve relative to the tubular central housing; and
  wherein the circuit is configured to transmit data to a processor regarding the detected rotational movement and the detected axial movement of the sleeve.

45. The pointing device of claim 44, wherein the sensor is selected from the group consisting of a laser sensor and an optical sensor.

46. The pointing device of claim 44, further comprising at least one end sensor capable of detecting movement of the sleeve beyond a predetermined location on the tubular central housing.

47. The pointing device of claim 44, further comprising a pivot assembly comprising a pivot disposed beneath a portion of the tubular central housing, wherein an opening in the tubular central housing fits over a top section of the pivot such that the central housing is configured to pivot about the pivot.

48. The pointing device of claim 44, further comprising a pick switch activated by a downward pressure being applied to the sleeve, the pick switch configured to provide a click operation.

49. The pointing device of claim 48, further comprising a pick adjuster assembly in communication with the pick switch, the pick adjuster assembly including a pick adjuster movable by a user to select a required force for triggering the pick switch.

50. The pointing device of claim 44, wherein the sleeve is comprised of a flexible material selected from the group consisting of metal, plastic, rubber, cloth and paper, and wherein the sleeve conforms to a shape of the central housing.

51. The pointing device of claim 44, further comprising a carriage supporting the tubular central housing and a base, wherein the carriage is pivotable about the base.

52. The pointing device of claim 44, further comprising at least one flexure secured to a base and supporting the central housing, wherein the flexure is made of a deformable material.

53. The pointing device of claim 44, further comprising at least one leaf spring disposed between a base and the central housing.

54. The pointing device of claim 53, wherein the at least one leaf spring is located proximate an end of the tubular central housing.

55. The pointing device of claim 44, further comprising at least one solenoid, the at least one solenoid supporting the tubular central housing.

56. The pointing device of claim 55, wherein each of the at least one solenoid comprises a plunger, a coil surrounding at least a portion of the plunger, and a plunger return spring.

57. The pointing device of claim 44, wherein the sensor is aligned with the aperture of the tubular central housing such that light provided by the sensor is directed through the aperture and upon a section of a surface of the sleeve exposed through the aperture.

* * * * *